United States Patent
Keane et al.

(10) Patent No.: US 7,850,555 B2
(45) Date of Patent: Dec. 14, 2010

(54) APPARATUSES AND METHODS FOR CONTROLLING A VARIABLE SPEED TRANSMISSION

(75) Inventors: James C. Keane, Chapel Hill, NC (US); Hiroshi Hojo, Asaka (JP)

(73) Assignee: Honda Motor Co., Ltd., Tokyo (JP)

( * ) Notice: Subject to any disclaimer, the term of this patent is extended or adjusted under 35 U.S.C. 154(b) by 1170 days.

(21) Appl. No.: 10/909,113

(22) Filed: Jul. 30, 2004

(65) Prior Publication Data

US 2006/0021313 A1    Feb. 2, 2006

(51) Int. Cl.
*F16H 61/00* (2006.01)
*A01D 69/08* (2006.01)

(52) U.S. Cl. ............... 474/19; 474/8; 474/11; 474/21; 474/37; 56/11.8

(58) Field of Classification Search ........... 474/8, 474/11, 21, 19, 37; 56/11.8
See application file for complete search history.

(56) References Cited

U.S. PATENT DOCUMENTS

| | | | |
|---|---|---|---|
| 1,909,933 A * | 5/1933 | Donley ............... 74/124 |
| 2,694,316 A * | 11/1954 | Hultin ............... 474/21 |
| 3,195,364 A * | 7/1965 | Pauli ............... 474/19 |
| 4,117,652 A * | 10/1978 | Jones et al. ............... 56/11.8 |
| 4,132,121 A * | 1/1979 | Clarke ............... 474/27 |
| 4,281,732 A | 8/1981 | Hoch |
| 4,309,862 A | 1/1982 | Carlson |
| 4,310,082 A * | 1/1982 | Elmy et al. ............... 192/218 |
| 4,327,539 A | 5/1982 | Bricko et al. |
| 4,335,566 A | 6/1982 | Hurd |
| 4,466,232 A | 8/1984 | Beugelsdyk et al. |
| 4,476,643 A | 10/1984 | Hilchey et al. |
| 4,523,917 A * | 6/1985 | Schildt ............... 474/19 |
| 4,531,347 A | 7/1985 | Schütz |
| 4,667,459 A | 5/1987 | Scanland et al. |
| 4,835,949 A | 6/1989 | Seyerle |
| 4,841,794 A | 6/1989 | Hikishima |
| 4,924,988 A | 5/1990 | Page |
| 4,932,192 A | 6/1990 | Ishimaru |
| 5,251,711 A | 10/1993 | Meyer et al. |
| 5,261,214 A | 11/1993 | Wollersheim |
| 5,316,097 A | 5/1994 | Meyer et al. |

(Continued)

*Primary Examiner*—Bradley T King
*Assistant Examiner*—Mahbubur Rashid
(74) *Attorney, Agent, or Firm*—Jenkins, Wilson, Taylor & Hunt, P.A.

(57) ABSTRACT

Apparatuses and methods are disclosed for controlling a variable speed transmission including an actuator, a cam follower, and a speed adjustment cam. The actuator is rotatable through a first phase and a subsequent second phase, and includes an actuator cam surface and a variator. The cam follower is movable in response to contact with the actuator cam surface during rotation through the first phase, for actuating a coupler of the transmission between a disengaged position and an engaged position. The variator is movable along the speed adjustment cam during rotation through the second phase for enabling adjustment of a torque transfer mechanism associated with the transmission. By this configuration, control over the coupling of the transmission to a torque input such as a motor and control over the speed of the transmission are both enabled through rotation of a single actuator, and thus can be implemented in a self-propelled machine such as a lawnmower using a single operator-manipulated control.

23 Claims, 17 Drawing Sheets

U.S. PATENT DOCUMENTS

| | | |
|---|---|---|
| 5,375,674 A | 12/1994 | Peter |
| 5,377,774 A | 1/1995 | Lohr |
| 5,403,240 A * | 4/1995 | Smith et al. .................... 474/8 |
| 5,467,583 A | 11/1995 | Beugelsdyk et al. |
| 5,542,241 A | 8/1996 | Lydy et al. |
| 5,701,967 A | 12/1997 | Barnard |
| 5,735,064 A | 4/1998 | Holl |
| 6,047,614 A | 4/2000 | Beugelsdyk et al. |
| 6,082,083 A | 7/2000 | Stalpes |
| 6,146,295 A * | 11/2000 | Mor et al. ..................... 474/13 |
| 6,413,178 B1 * | 7/2002 | Chamberland ............... 474/19 |
| 6,475,109 B2 | 11/2002 | Blanchard |
| 6,502,479 B1 * | 1/2003 | Lee ......................... 74/568 R |
| 6,701,796 B2 * | 3/2004 | Blanchard .................... 74/325 |
| 2002/0178708 A1 | 12/2002 | Williams et al. |
| 2002/0183145 A1 | 12/2002 | Blanchard |
| 2003/0056481 A1 | 3/2003 | Trefz |

* cited by examiner

Fig · 1

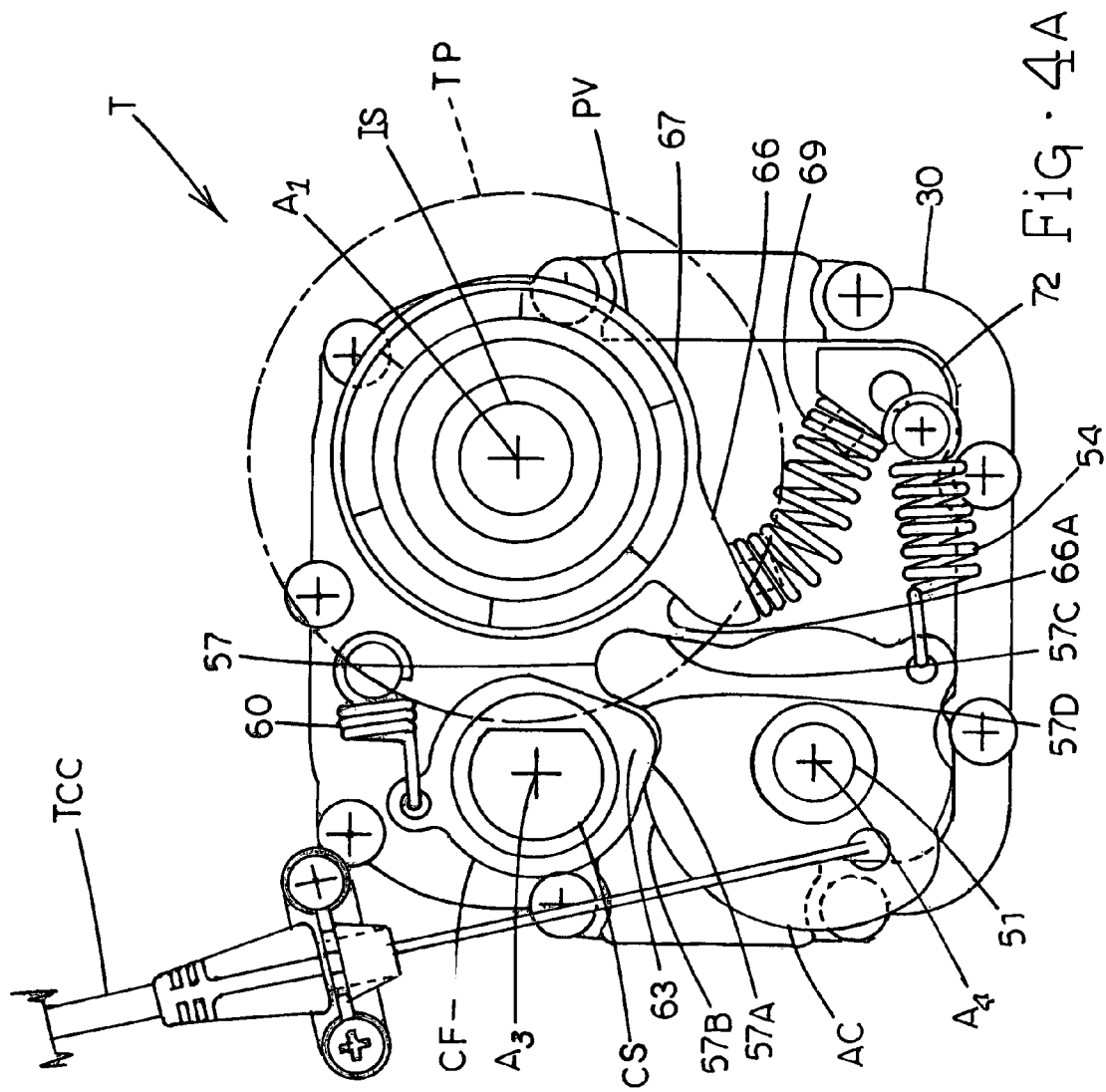

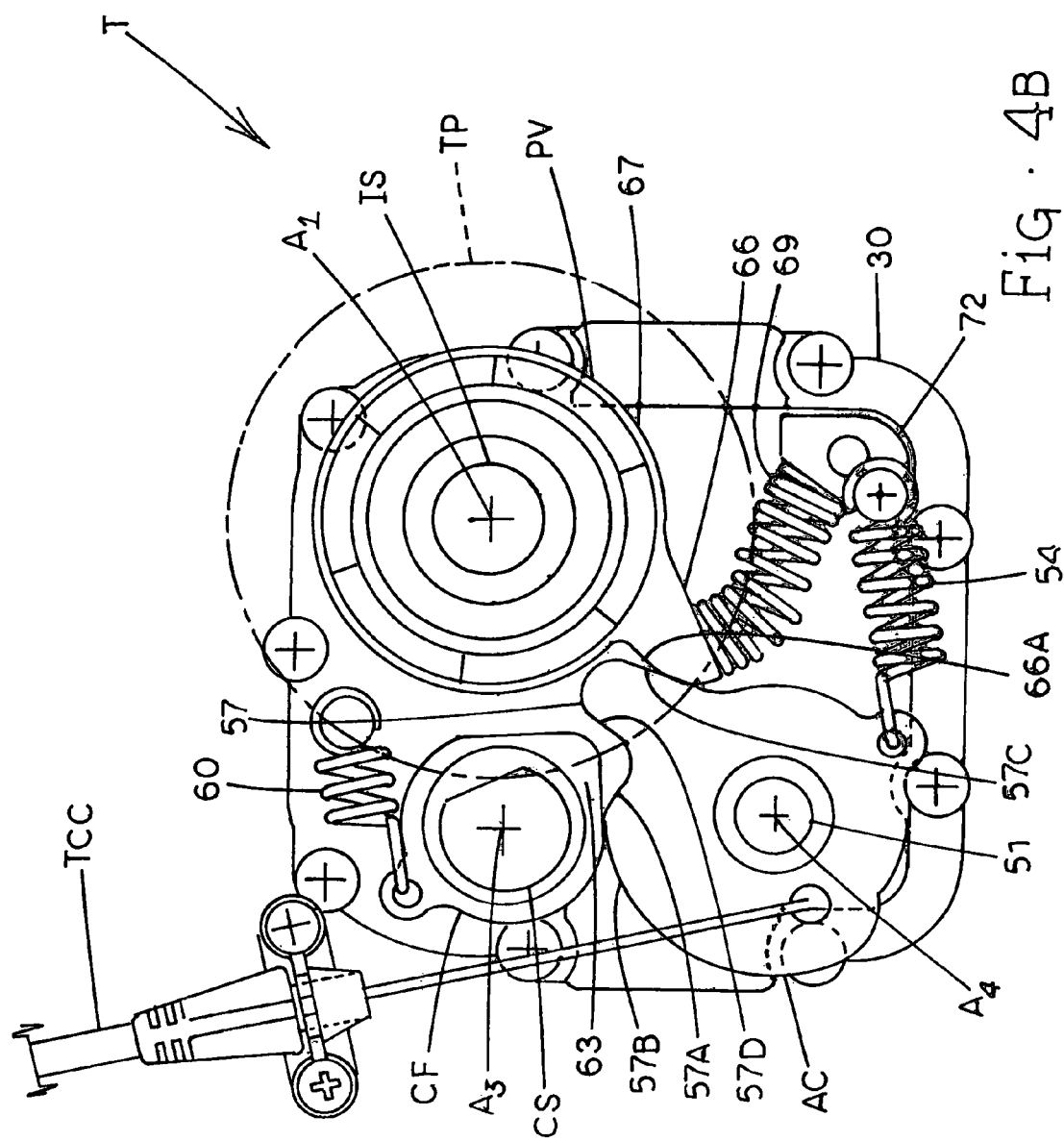

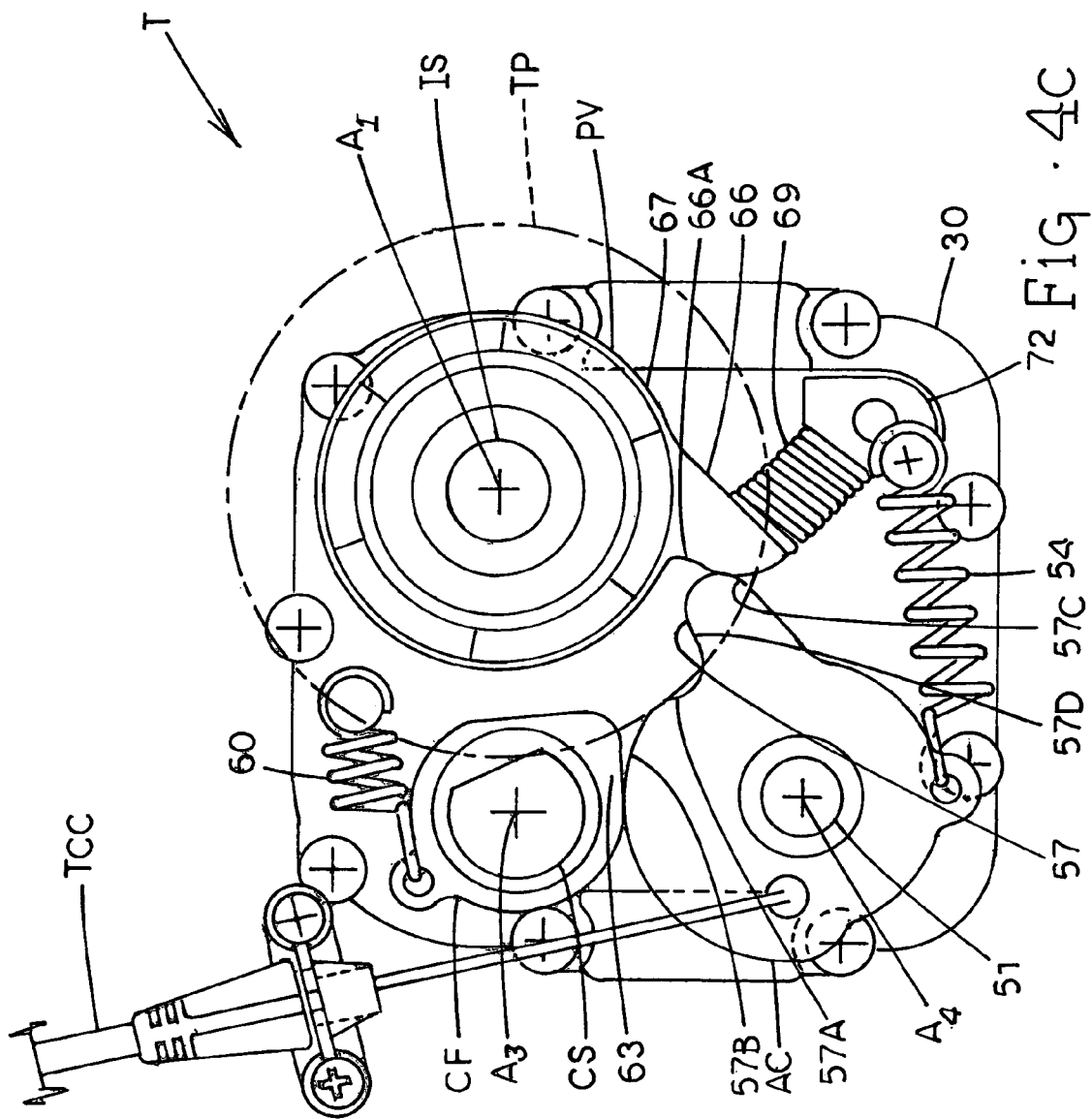

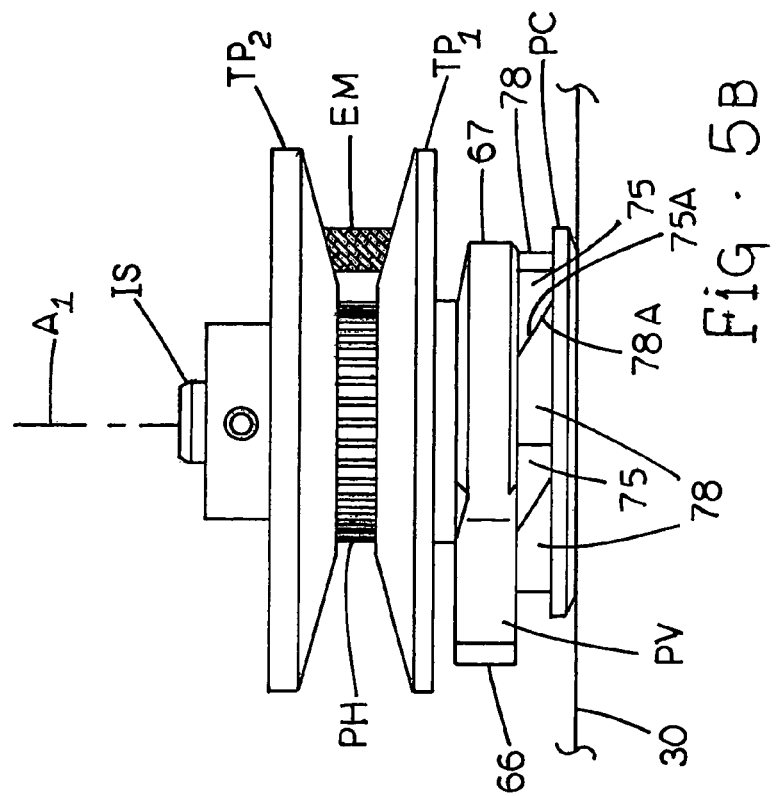
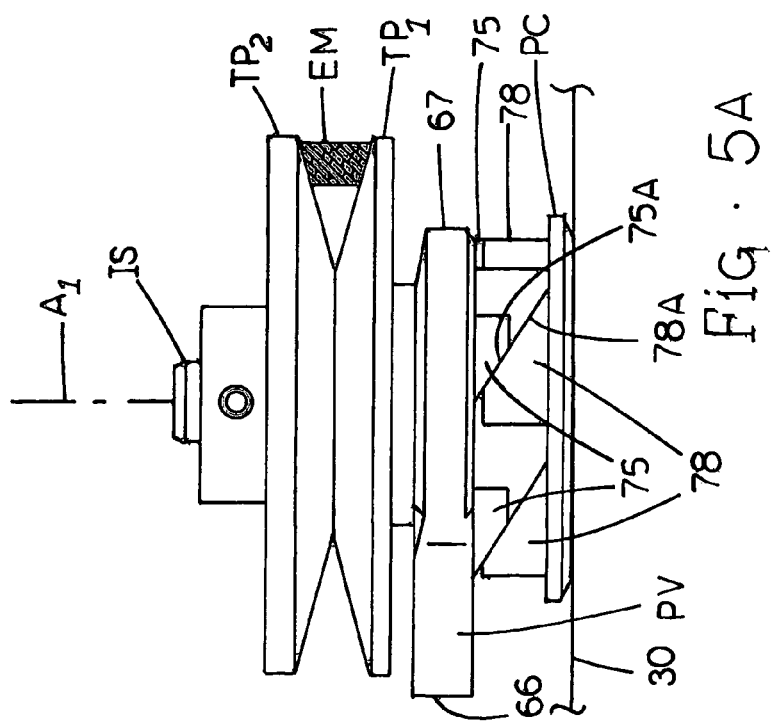

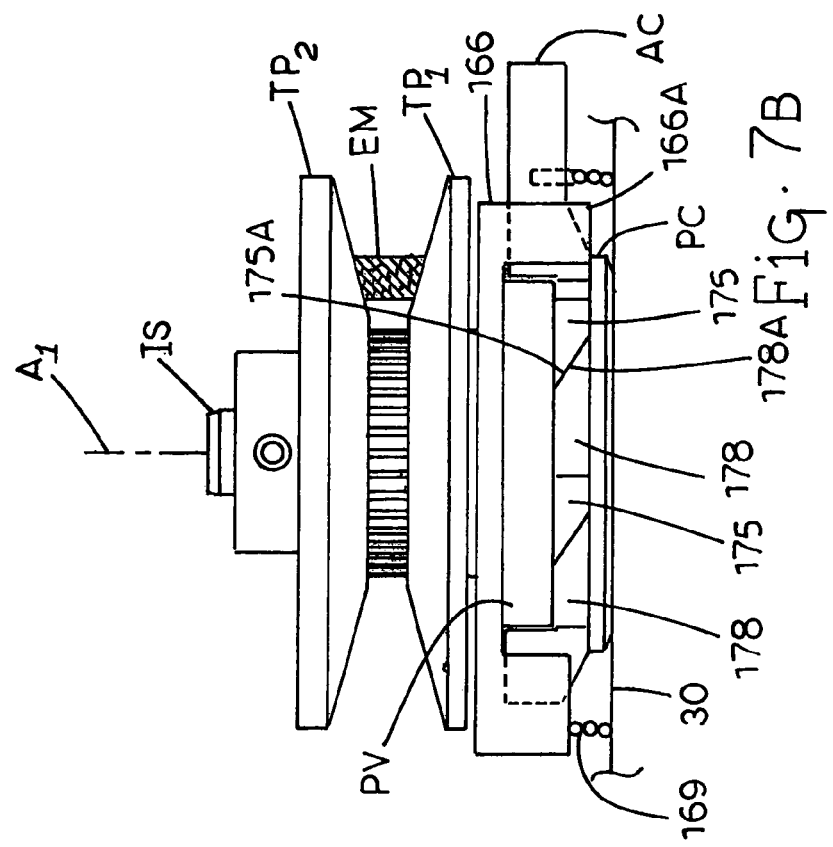
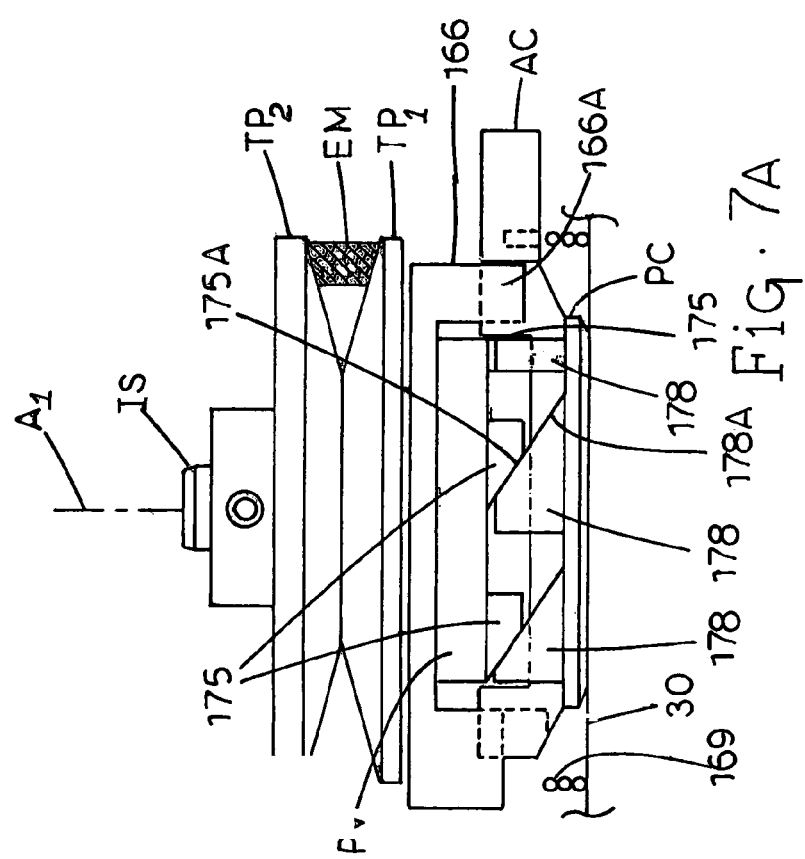

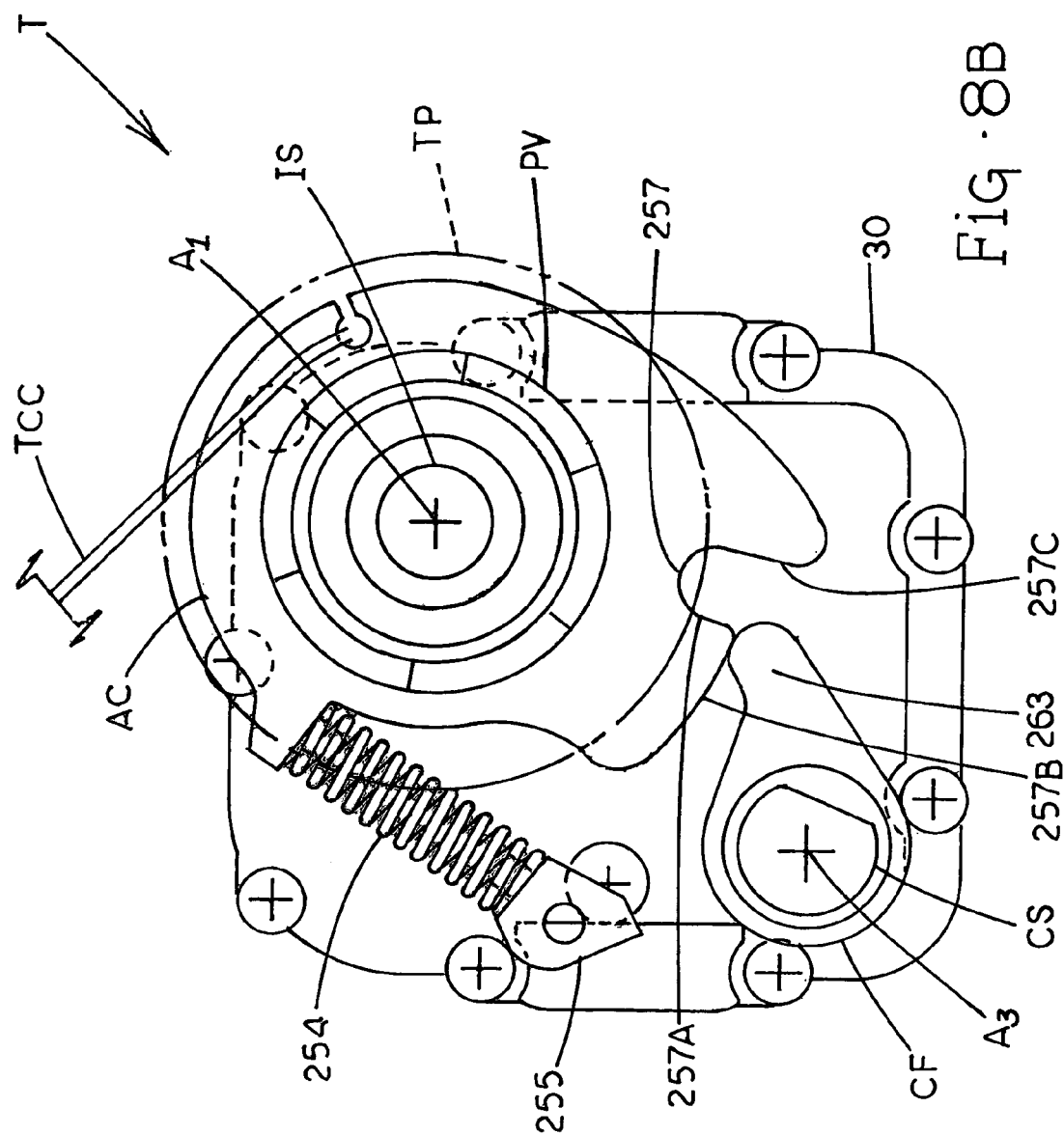

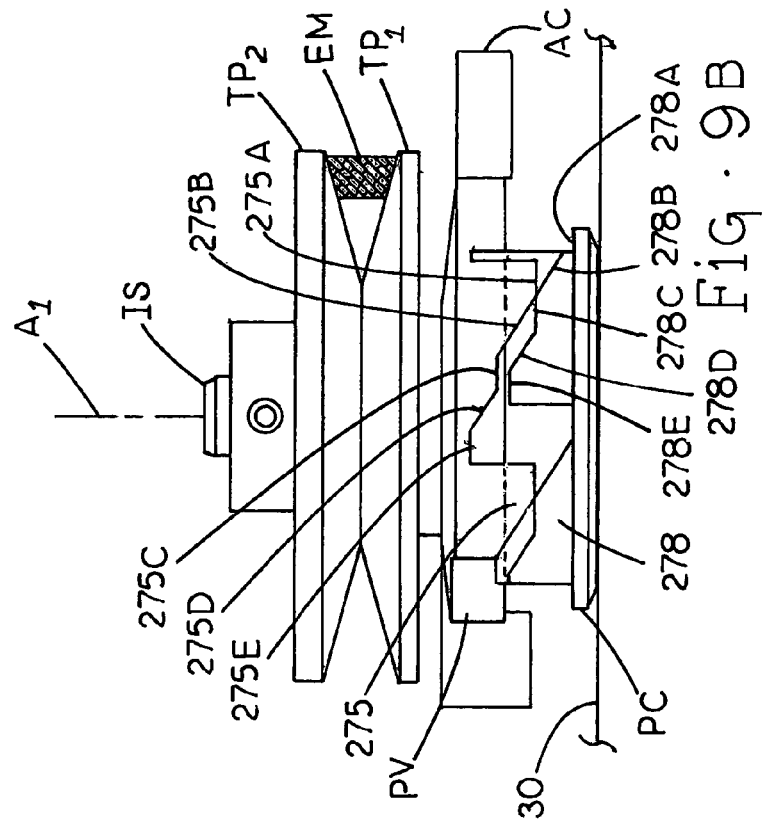
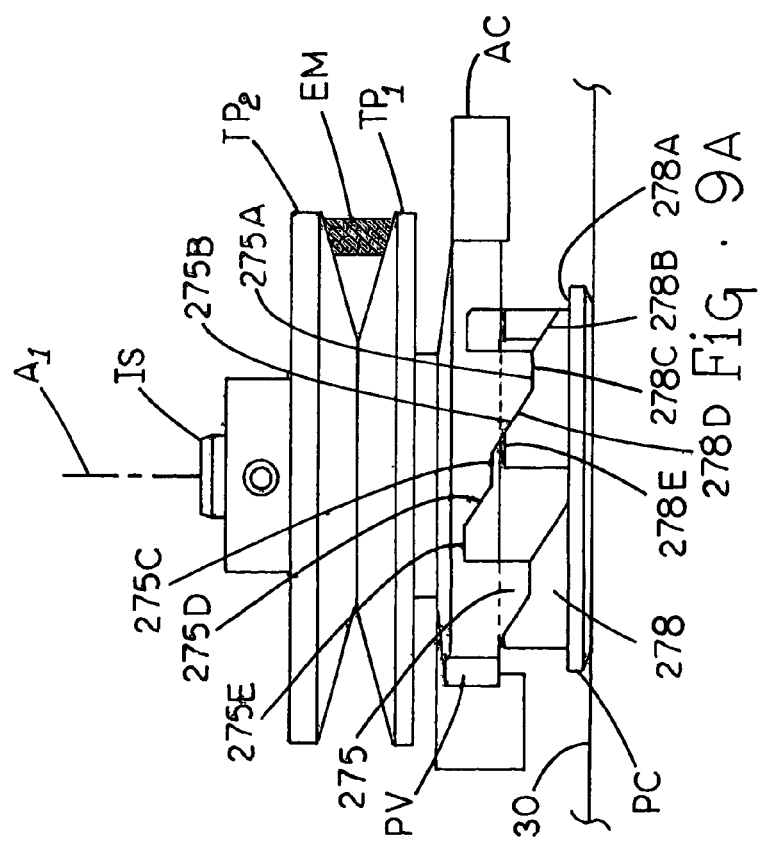

APPARATUSES AND METHODS FOR CONTROLLING A VARIABLE SPEED TRANSMISSION

TECHNICAL FIELD

The subject matter disclosed herein relates generally to variable speed transmissions and, more particularly, to the actuation and control of such transmissions.

BACKGROUND ART

Self-propelled machines, such as lawnmowers and the like, often provide handles on which controls are mounted for manipulation by operators or users of such machines. In particular, a "walk behind" type self-propelled machine typically has a handle extending behind a power plant or other main operative assembly of the machine for gripping by the operator as the operator walks behind the machine during movement thereof in a forward direction. Typically, one or more controls are mounted towards the end of the handle in a convenient location for the user to manipulate while gripping the handle and operating the machine. Typically, any control device mounted to the handle is capable of implementing only a single function. Accordingly, the ability of an operator to control multiple types of functions has conventionally required the mounting of multiple types of control mechanisms or other devices on the handle of the machine. Unfortunately, recent marketing research indicates that many consumers of self-propelled machines would prefer a minimum number of control mechanisms requiring their manipulation during operation of such machines in order to simplify use of the machines.

Many examples exist of conventional self-propelled machines that require the use of multiple, separate controls to implement different functions. U.S. Patent Application Pub. No. U.S. 2002/0183145 to Blanchard discloses a variable-speed transmission for a self-propelled lawnmower. The transmission is coupled to a motor by means of a drive belt carried by a variable-pitch pulley rotating with the motor's shaft and a variable-pitch pulley rotating with the transmission's input shaft. A manual speed control cable actuates the transmission's variable-pitch pulley. To engage or disengage a clutch internal to the transmission, however, a separate control mechanism and associated cable are required. Accordingly, a lawnmower equipped with this transmission would require separate controls on its handle for manipulation by the operator in order to engage/disengage the clutch and adjust speed.

Some approaches have been taken in which a single transmission cable is employed to control a clutch, transmission speed, or both, but are considered to be excessively complex, costly, unreliable, or to otherwise leave room for improvement. For example, U.S. Pat. No. 6,062,083 to Dunegan discloses a variable-speed lawnmower a stationary handle attached to a mower deck and a large, plastic molded handle grip that slides up and down relative to the stationary handle. A pivot rod is disposed inside the handle grip, and slides along a channel formed within the handle grip. A transmission cable is secured to an assembly within the handle grip mechanically associated with the pivot rod. The handle grip can be slid down the stationary handle by an operator. The sliding motion of the handle grip is converted into pivoting motion of the pivot rod by means of the cam-like interface between the pivot rod and the channel, and results in the transmission cable being pulled upwardly to increase tension in a drive belt and thus increase speed. A second embodiment disclosed in U.S. Pat. No. 6,062,083 to Dunegan operates on the same principle, but substitutes a plurality of linkages for the pivot rod and the channel. Additional examples of the use of a single transmission cable are disclosed in U.S. Pat. No. 6,475,109 to Blanchard; U.S. Pat. No. 4,882,897 to Oshima et al.; and U.S. Pat. No. 4,835,949 to Severle; and U.S. Patent Application Pub. No. U.S. 2003/0056481 to Trefz.

Therefore, in self-propelled machines, and particularly those equipped with variable- or multi-speed transmissions, there continues to exist a need for providing improved apparatuses and methods for controlling both the coupling/decoupling and speed adjustment functions of the transmission using a single linking member manipulated by an operator of a machine.

SUMMARY

According to one embodiment, an apparatus for controlling a variable-speed transmission comprises an actuator cam, a cam follower, and a speed adjustment device. The actuator cam is rotatable through a first phase and a subsequent second phase in response to operator control. The cam follower is movable by the actuator cam during rotation through the first phase between a disengaged state at which the transmission is decoupled from a torque input, and an engaged state at which the transmission is coupled to the torque input. The speed adjustment device comprises a movable portion that is movable by the actuator cam during rotation through the second phase between a low speed state at which a speed of the transmission is at a minimum and a high speed state at which the speed is at a maximum.

According to another embodiment, an apparatus is provided for controlling a variable-speed transmission. The transmission comprises a coupler for alternately engaging and disengaging power between the transmission and a motor, and an adjustable torque transfer mechanism interconnecting the transmission and the motor for varying a speed of the transmission. The apparatus comprises an actuator, a cam follower, and a speed adjustment cam. The actuator is rotatable through a first phase and a subsequent second phase, and comprises an actuator cam surface and a variator. The cam follower is movable in response to contact with the actuator cam surface during rotation through the first phase, for actuating the coupler between a disengaged position and an engaged position. The variator is movable along the speed adjustment cam during rotation through the second phase for enabling adjustment of the torque transfer mechanism.

According to yet another embodiment, an apparatus is provided for controlling a variable-speed transmission. The transmission comprises a coupler for alternately engaging and disengaging power between the transmission and a motor, and an adjustable torque transfer mechanism interconnecting the transmission and the motor for varying a speed of the transmission. The apparatus comprises an actuator cam, a cam follower, a speed adjustment cam, and a variator. The actuator cam is rotatable through a first phase and a subsequent phase, and comprises first, second and third actuator cam surfaces. The cam follower is provided for actuating the coupler between a disengaged position and an engaged position. The cam follower is movable from contact with the first actuator cam surface at the disengaged position and into contact with the second actuator cam surface at the engaged position in response to rotation of the actuator cam through the first phase. The speed adjustment cam comprises a speed adjustment cam surface. The variator comprises a variator surface. The variator is rotatable through contact with the third actuator cam surface in response to rotation of the actuator cam through the second phase, for enabling movement of the variator surface along the speed adjustment cam surface and adjustment of the torque transfer mechanism.

According to a further embodiment, an apparatus is provided for controlling a variable-speed transmission. The transmission comprises a coupler for alternately engaging and disengaging power between the transmission and a motor, and an adjustable torque transfer mechanism interconnecting the transmission and the motor for varying a speed of the transmission. The apparatus comprises an actuator cam, a cam follower, a speed adjustment cam, and a variator. The actuator cam is rotatable through a first phase and a subsequent second phase, and comprises first and second actuator cam surfaces. The cam follower is provided for actuating the coupler between a disengaged position and an engaged position. The cam follower is movable from contact with the first actuator cam surface at the disengaged position and into contact with the second actuator cam surface at the engaged position in response to rotation of the actuator cam through the first phase. The speed adjustment cam comprises a speed adjustment cam surface. The variator comprises a variator surface. The variator is rotatable through contact with the first actuator cam surface in response to rotation of the actuator cam through the second phase, for enabling movement of the variator surface along the speed adjustment cam surface and adjustment of the torque transfer mechanism.

According to a still further embodiment, an apparatus is provided for controlling a variable-speed transmission. The transmission comprises a coupler for alternately engaging and disengaging power between the transmission and a motor, and an adjustable torque transfer mechanism interconnecting the transmission and the motor for varying a speed of the transmission. The apparatus comprises an actuator cam, a cam follower, and a speed adjustment cam. The actuator cam is rotatable through a first phase and a subsequent second phase and comprises a variator surface rotatable therewith. The cam follower is provided for actuating the coupler between a disengaged position and an engaged position through contact with the actuator cam in response to rotation of the actuator cam through the first phase. The speed adjustment cam comprises a speed adjustment cam surface. The speed adjustment cam surface comprises a flat and an incline. The variator surface is movable along the flat in response to rotation of the actuator cam through the first phase. The variator surface is movable along the incline in response to rotation of the actuator cam through the second phase for enabling adjustment of the torque transfer mechanism.

According to an additional embodiment, a method is provided for controlling a variable-speed transmission. An actuator cam is rotated through a first arc to actuate a cam follower, whereby the actuator cam causes the transmission to be coupled with a torque input without actuating a speed-varying device of the transmission. The actuator cam is rotated through a second arc following the first arc to actuate the speed-varying device, whereby the actuator cam causes a speed of the transmission to be adjusted without changing a position of the cam follower.

It is therefore an object to provide novel apparatuses and methods for controlling a variable speed transmission.

An object having been stated hereinabove, and which is achieved in whole or in part by the present disclosure, other objects will become evident as the description proceeds when taken in connection with the accompanying drawings as best described hereinbelow.

BRIEF DESCRIPTION OF THE DRAWINGS

FIG. 4A is a plan view of a transmission control apparatus provided in accordance with one embodiment disclosed herein, while the transmission is in a disengaged state;

FIG. 4B is a plan view of the transmission control apparatus illustrated in FIG. 4A, while the transmission is in an engaged state and at a LOW speed state;

FIG. 4C is a plan view of the transmission control apparatus illustrated in FIG. 4A, while the transmission is in a HIGH speed state;

FIG. 5A is a side elevation view of the transmission control apparatus illustrated in FIGS. 4A-4C while the transmission is in a disengaged state or the LOW speed state;

FIG. 5B is a side elevation view of the transmission control apparatus illustrated in FIGS. 4A-4C while the transmission is in the HIGH speed state;

FIG. 7A is a side elevation view of the transmission control apparatus illustrated in FIGS. 6A-6C while the transmission is in a disengaged state or the LOW speed state;

FIG. 7B is a side elevation view of the transmission control apparatus illustrated in FIGS. 6A-6C while the transmission is in a HIGH speed state;

FIG. 8B is a plan view of the transmission control apparatus illustrated in FIG. 8A, while the transmission is in an engaged state and at a LOW speed state;

FIG. 9A is a side elevation view illustrating portions of the transmission pulley and pulley variator of the transmission control apparatus illustrated in FIGS. 8A-8C while the transmission is in a disengaged state;

FIG. 9B is a side elevation view illustrating portions of the transmission pulley and pulley variator of the transmission control apparatus illustrated in FIGS. 8A-8C at the time of engagement of the transmission or after the transmission has been engaged.

DETAILED DESCRIPTION

Figure 1:
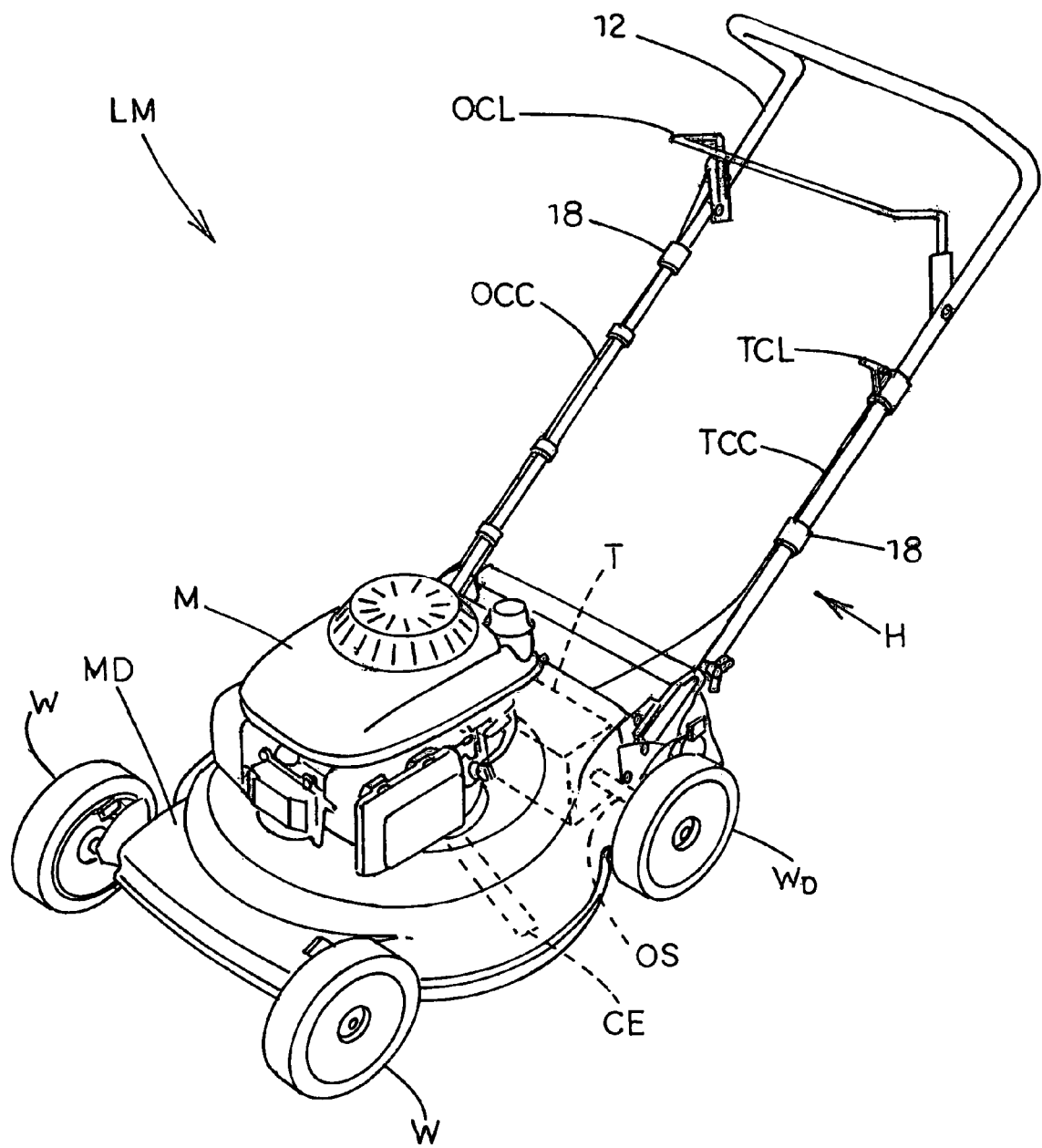
FIG. 1 is a perspective view of an example of a self-propelled machine in which the transmission control apparatus disclosed herein can be implemented.

Referring now to FIG. 1, a self-propelled machine is illustrated. As one non-limiting example of an implementation of the principles disclosed herein, the machine is shown for illustration purposes only as a self-propelled lawnmower, generally designated LM. It can be appreciated, however, that the embodiments disclosed herein are not limited to lawnmowers or to any particular type of lawnmower such as a riding mower or a walk-behind mower. The embodiments can apply to any self-propelled machines, whether the riding or walk-behind type, such as snow blowers, leaf blowers, yard vacuums, tillers, edgers, seeders, trimmers, aerators, fertilizers, palette trucks, graders, vehicles for transportation, pavement and construction machines, and the like. Moreover, the embodiments can be utilized in conjunction with any non-mobile machine or tool that includes a rotating component requiring speed adjustment and an ON/OFF, clutching-type capability.

Continuing with the example provided in FIG. 1, lawnmower LM can comprise any suitable configuration generally known to persons skilled in the art or later developed. In the exemplary embodiment, lawnmower LM includes a frame such as a mower deck MD. A handle, generally designated H, is coupled to mower deck MD by any suitable means, and extends upwardly therefrom at an angle appropriate for comfortable grasping and manipulation by an operator. Mower deck MD is supported for rolling movement over a surface by a set of wheels, including one or more idle (non-driving) wheels W and one or more driving wheels $W_D$. The embodiment is not limited to which one or more of wheels W functions as driving wheel or wheels $W_D$, although typically the rearmost wheel or wheels serve this function.

Figure 2:
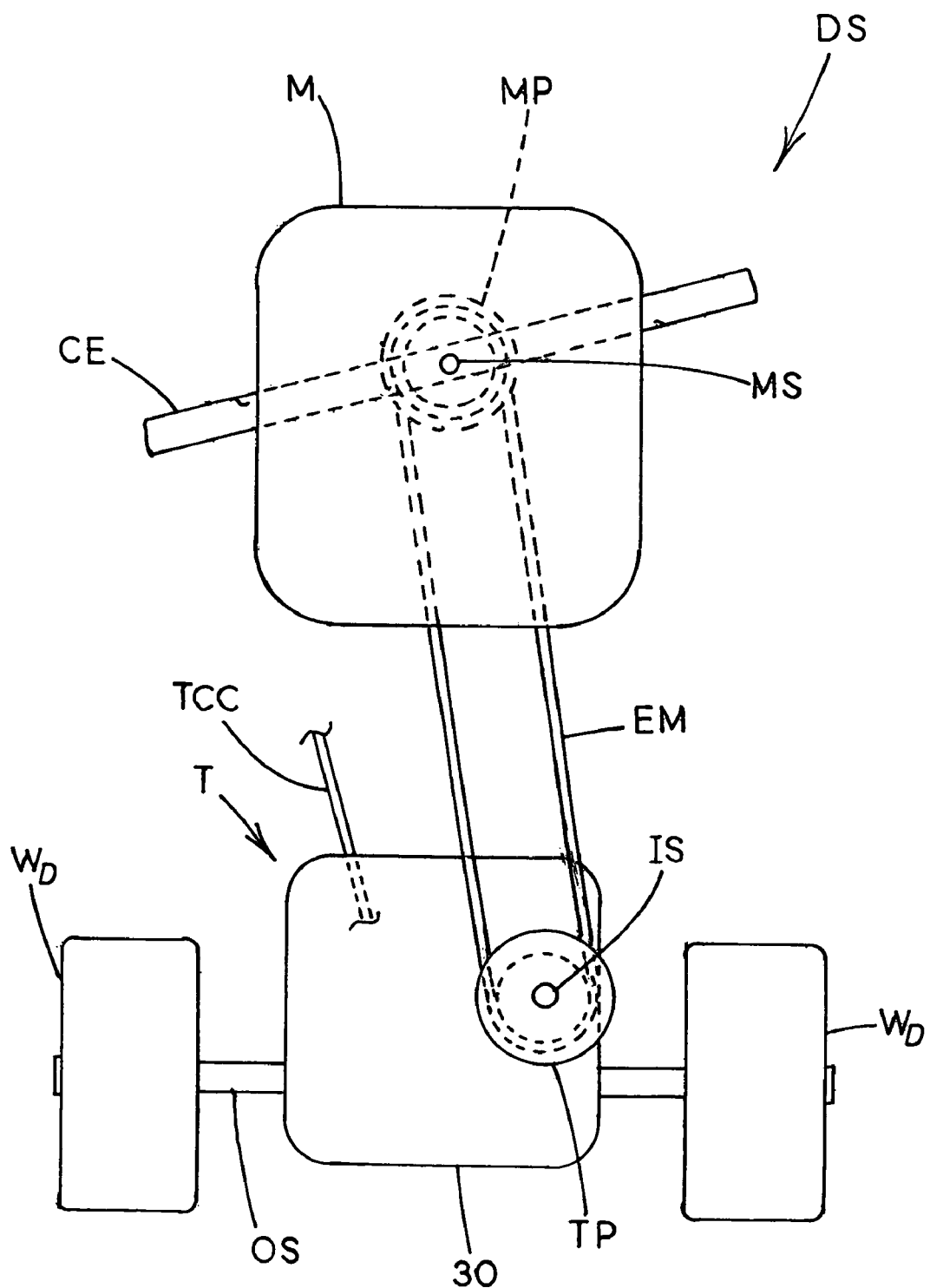
FIG. 2 is a schematic view of a powered drive system which can be provided with the self-propelled machine of FIG. 1.

Referring to FIGS. 1 and 2, lawnmower LM also includes a powered drive system or assembly that includes a suitable motor M, such as an electric motor or an internal combustion engine, and a transmission generally designated T. Both motor M and transmission T are mounted to mower deck MD in a suitable manner. The drive system and associated components are schematically illustrated in FIG. 2, and generally designated DS. A motor shaft MS of motor M rotates a suitable cutting element CE such as a blade or blades disposed within an interior of mower deck MD. Motor M also transfers power to driving wheel(s) $W_D$ through transmission T, thereby rendering lawnmower LM self-propelled in response to control by the operator. For this purpose, motor M can be coupled to transmission T through any suitable torque transfer mechanism, and preferably a variable (i.e., adjustable) torque transfer mechanism. In the non-limiting example illustrated in FIG. 2, the torque transfer mechanism comprises an endless member EM such as a belt that is carried at one end by a motor pulley MP and at the other end by a transmission pulley TP. Motor pulley MP rotates with motor shaft MS, and transmission pulley TP rotates with an input shaft IS of transmission T. Thus, torque from motor shaft MS is transferred to input shaft IS via endless member EM. Torque from input shaft IS can be transferred to an output shaft OS coupled to driving wheel(s) $W_D$ through an appropriate internal transmission assembly, one non-limiting example of which is described below in conjunction with FIGS. 3A and 3B. In some embodiments, output shaft OS can comprise a pair of axles or half-shafts coupled to respective driving wheel(s) $W_D$.

As shown in FIG. 2, in advantageous embodiments, transmission pulley TP is a variable-pitch pulley, the function of which is generally known and described in more detail below as it relates to the embodiments disclosed herein. Referring to FIGS. 5A and 5B, transmission pulley TP comprises two flanges or halves, illustrated as a first pulley member $TP_1$ and a second pulley member $TP_2$. To enable the pitch or distance between first and second pulley members $TP_1$ and $TP_2$ to be varied, at least one of first and second pulley members $TP_1$ and $TP_2$ is axially translatable along input shaft IS relative to the other. In the present embodiment, first pulley member $TP_1$ is axially movable and second pulley member $TP_2$ is axially stationary. First pulley member $TP_1$ is mechanically referenced to input shaft IS by any suitable means that permits first pulley member $TP_1$ to transmit rotational force to input shaft IS while, at the same time, enabling the axial adjustment of first pulley member $TP_1$ relative to second pulley member $TP_2$. For instance, first pulley member $TP_1$ can be mated with input shaft IS by means of splines (not shown). Moreover, as shown in FIG. 5B, first pulley member $TP_1$ includes a splined pulley hub PH that slidingly engages complementary splines (not shown) on a central portion of second pulley member $TP_2$. Second pulley member $TP_2$ is secured to input shaft IS by any suitable means, such as a set screw and threaded bore or a key and keyway.

By the configuration just described, the pitch of transmission pulley TP can be adjusted to vary the radius of rotation of endless member EM carried thereby. For instance, widening the distance between first and second pulley members $TP_1$ and $TP_2$ causes the endless member EM to make frictional contact with first and second pulley members $TP_1$ and $TP_2$ at a location radially closer to input shaft IS with which transmission pulley TP rotates. Assuming a given frequency ω at which endless member EM is rotating under the driving force of motor M, the reduction in the radius r at which endless member EM turns relative to input shaft IS results in an increased angular velocity α at which input shaft IS is driven by endless member EM, according to the relation α=ω/r. As shown in FIGS. 5A and 5B, the respective contact surfaces of endless member EM and first and second pulley members $TP_1$ and $TP_2$ can be complementarily tapered to facilitate movement of endless member EM toward and away from input shaft IS.

Although not specifically shown in the drawings, in advantageous embodiments, motor pulley MP can also be a variable-pitch pulley. In this case, however, the pitch of motor pulley MP can vary inversely to that of transmission pulley TP to maintain tension in endless member EM. For instance, the pitch of motor pulley MP can increase while the pitch of transmission pulley TP decreases. In addition, pitch of motor pulley MP varies on a different scale or proportion as compared with transmission pulley TP to enable the variance in the pitch of transmission pulley TP to adjust the speed ratio as between motor shaft MS and input shaft IS.

The embodiments disclosed herein are not limited to any particular configuration of transmission T or the torque transfer mechanism. In advantageous embodiments, transmission T can be a variable-speed transmission, and particularly a continuously variable-speed transmission. As appreciated by persons skilled in the art, by providing an appropriate control mechanism, an operator can control the output speed of a continuously variable-speed transmission, and thus the speed of driving wheel(s) $W_D$, over a continuous or substantially continuous range between a minimum low speed (which can be zero) and a maximum high speed. Generally, for the embodiments disclosed herein, the variation/adjustment of torque and/or transmission speed can be effected through the axial translation of one or more components of the torque transfer mechanism and/or transmission T, one example being first pulley member $TP_1$ of transmission pulley TP as described above. A continuously variable-speed transmission can be implemented at least in part through the use of variable-pitch transmission pulley TP or other suitable torque/angular speed varying means. An example of a suitable continuously variable-speed transmission that includes transmission pulley TP is described below with reference to FIGS. 3A and 3B.

Referring again to FIG. 1, lawnmower LM includes an operational control lever OCL and a transmission control lever TCL, both of which are preferably mounted to handle H. Preferably, operational control lever OCL and transmission control lever TCL are disposed at or near a proximal end section 12 of handle H to facilitate manipulation by an operator. Operational control lever OCL communicates with motor M and/or transmission T through a suitable linking member such as an operational control cable OCC. Transmission control lever TCL communicates with transmission T through a suitable linking member such as a transmission control cable TCC. As appreciated by persons skilled in the art, operational control cable OCC and transmission control cable TCC can be any suitable elongate components that are either flexible or rigid, and capable of transferring a force or actuation by translation and/or a change in tension. A non-limiting example is a cable, such as a Bowden wire, at least a portion of which is typically encased and extended through a coaxial sheath. To maintain a general position of operational control cable OCC and/or transmission control cable TCC relative to lawnmower LM, operational control cable OCC and/or transmission control cable TCC can be retained at one or more locations on lawnmower LM by one or more retaining members such as a retaining members 18 shown in FIG. 1.

Operational control lever OCL implements an operator presence or deadman control through the interaction of operational control lever OCL and motor M and/or transmission T via operational control cable OCC. Thus, operational control cable OCC is intercoupled between operational control lever OCL and an appropriate machine control component (not specifically shown) of drive system DS by any suitable means. The machine control component can be, for example, a kill switch of motor M that disconnects motor M from an ignition component (in the case of an internal combustion engine) or a battery or source of line voltage (in the case of an electric motor), a throttle of motor M, and/or a clutch, flywheel brake or similar device that controls the transfer of power from motor M to cutting element CE, transmission T and/or driving wheel(s) $W_D$. The pivoting or rotation of operational control lever OCL relative to handle H actuates operational control cable OCC and, in turn, the machine control component to implement the operator presence control.

As appreciated by persons skilled in the art, the operator presence control in general is a safety feature that is typically movable between two states, ON and OFF, and typically is biased toward its OFF state. When the operator is operating or manipulating lawnmower LM in an intended manner, such as by properly gripping both handle H and operational control lever OCL, the operator presence control is in the ON position. The ON position permits the motor M to be activated and/or cutting element CE to be driven, and lawnmower LM to be propelled using the power generated by motor M and transferred by transmission T. When, on the other hand, the operator is not operating or manipulating lawnmower LM in an intended manner, such as by releasing or failing to grip operational control lever OCL, the operator presence control is in the OFF position. The OFF position disables motor M, cutting element CE, and/or transmission T.

Many of the various types, structures, and functions of the components of lawnmower LM described thus far are generally known to persons skilled in the art, and therefore will not be further described.

Continuing with FIG. 1, in accordance with the embodiments disclosed herein, transmission control lever TCL implements two functions that conventionally have required two separate levers and associated linking members: coupling or clutch control and speed control. As appreciated by persons skilled in the art, the clutch control is movable between two states to engage an appropriate clutch or other type of coupling mechanism of transmission T so as to transfer power from motor M to driving wheel(s) $W_D$, and, alternately, to disengage the clutch mechanism so as to decouple the path of power transfer. As also appreciated by persons skilled in the art, the speed control determines the speed at which lawnmower LM is self-propelled, and thus is movable between a LOW speed state at which the speed of lawnmower LM is either zero or a minimum operating speed, and a HIGH speed state at which the speed of lawnmower LM is at a maximum operating speed. In the case of multi-speed transmissions, including variable-speed transmissions, the speed control is movable to intermediate states between the LOW and HIGH states. In lawnmowers equipped with continuously variable-speed transmissions, the throttle of motor M (when provided as an internal combustion engine) is typically fixed at a constant or substantially constant setting (i.e., the speed of motor is constant, such as 3100 rpm) during normal cutting operations. Often, this throttle setting corresponds to an optimized motor speed at which components of motor M can rotate in a balanced manner with minimal vibration, while maintaining the effectiveness and optimized speed of cutting element CE. Nonetheless, as appreciated by persons skilled in the art, provision can be made for adjusting the throttle in certain circumstances, such as to a choke setting for improved start-up conditions. Due to the normally constant throttle setting, the speed control typically interfaces with the transmission T to adjust one or more components thereof.

The embodiments described in more detail below provide an apparatus for controlling transmission T. This apparatus is structured to combine both clutch control and speed control. Thus, only a single transmission control lever TCL, with a single transmission control cable TCC associated therewith, is required in the embodiments disclosed herein. Accordingly, transmission control cable TCC is intercoupled between transmission control lever TCL and transmission T. The embodiments disclosed herein are not limited to any form of transmission control lever TCL or the manner of its operation. Transmission control lever TCL can be a lever mounted on one side of handle H as illustrated in FIG. 1, a U-shaped lever that pivots relative to handle H in a manner analogous to operational control lever OCL, the whole or a portion of handle H itself that pivots relative to mower deck MD, or a portion of handle H that slides or otherwise linearly translates relative to the remaining portion of handle H.

Figure 3A:
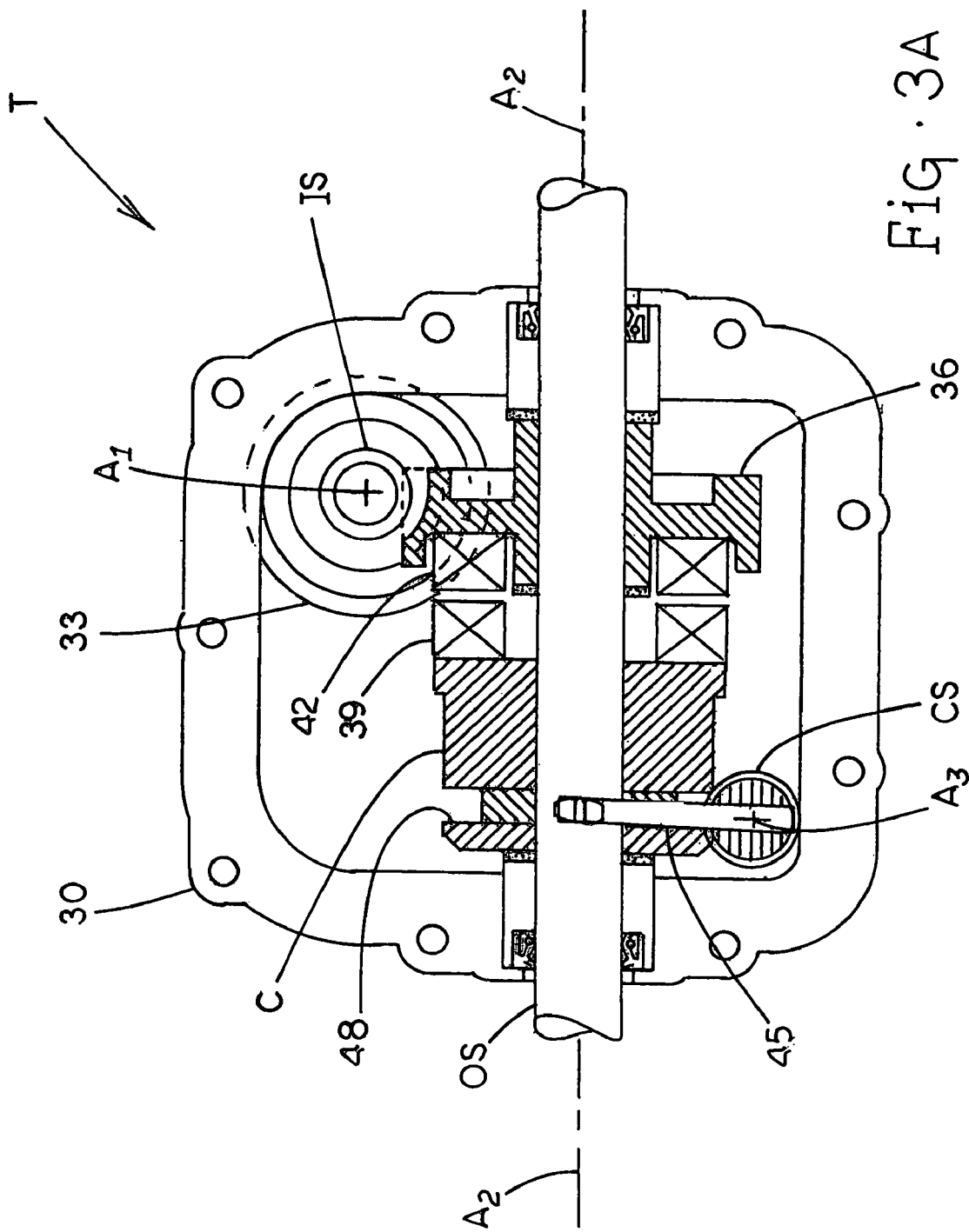
FIG. 3A is a cutaway view of an example of a transmission suitable for use in conjunction with the embodiments disclosed herein, while the transmission is in a disengaged state.
Figure 3B:
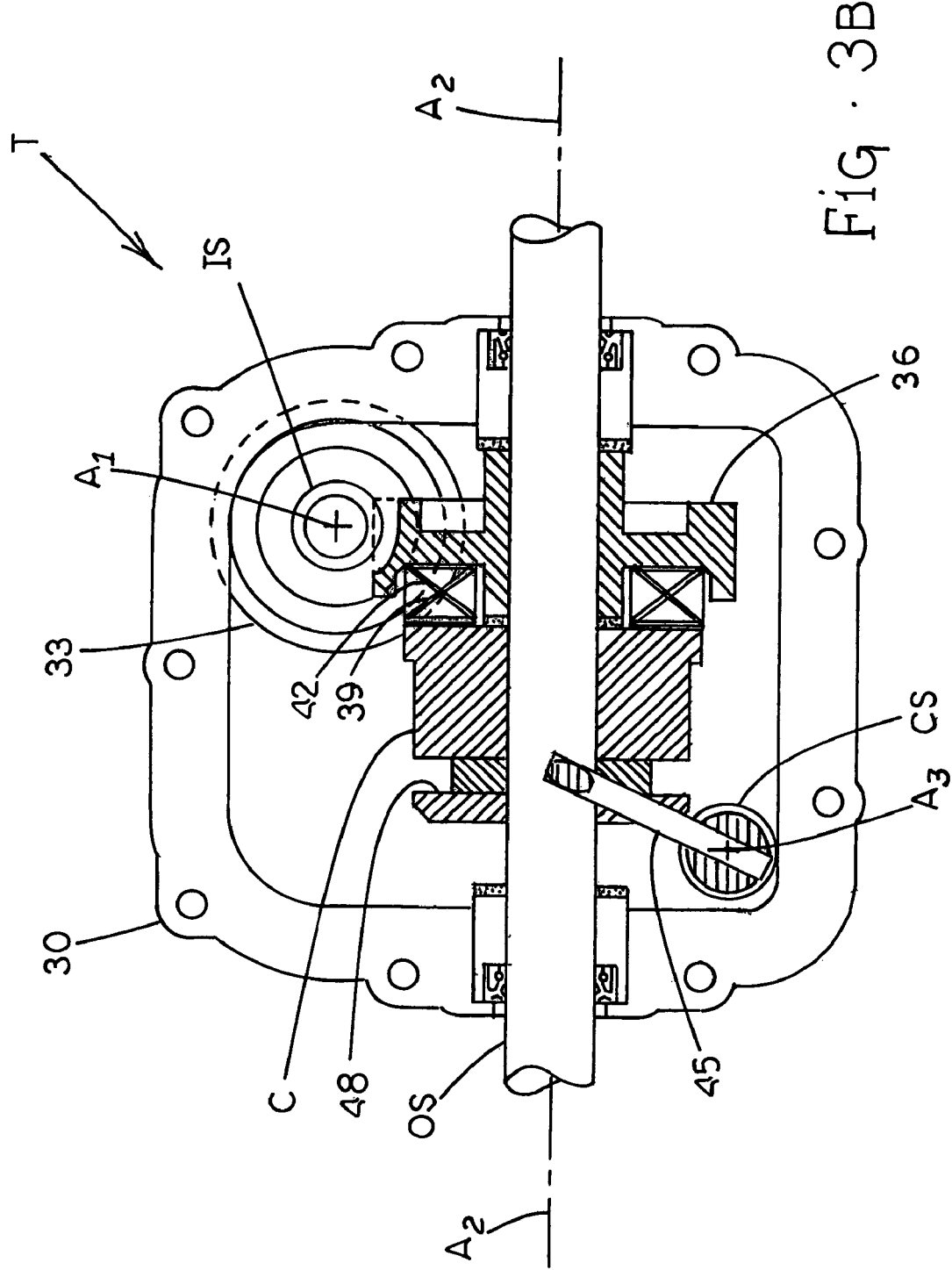
FIG. 3B is a cutaway view of the transmission illustrated in FIG. 3A, while the transmission is illustrated in an engaged state.

Referring now to FIGS. 3A and 3B, one non-limiting example of an internal transmission assembly for transmission T, suitable for use in conjunction with the embodiments disclosed herein, is illustrated. For clarity, transmission pulley TP has in effect been removed and only its outline indicated by phantom lines in FIGS. 3A and 3B, as well as in FIGS. 4A-4C, 6A-6C, and 8A-8C. FIG. 3A illustrates transmission in an OFF or disengaged position at which a clutch C or other suitable coupling mechanism decouples input shaft IS from output shaft OS. FIG. 3B illustrates transmission T in an alternate engaged position at which clutch C couples input shaft IS with output shaft OS. Transmission T includes a housing or transmission case 30 in which components of the internal transmission assembly are enclosed. Input shaft IS and output shaft OS, as well as a clutch actuating shaft CS, extend out from apertures formed through one or more walls of transmission case 30. In the present, exemplary embodiment, the axis of rotation $A_1$ of input shaft IS is generally normal to the axis of rotation $A_2$ of output shaft OS. For this configuration, it is advantageous to employ a worm 33 that meshes with a worm gear or cog wheel 36. Worm 33 is coaxially attached to or formed from input shaft IS for rotation about its axis $A_1$. Worm gear or cog wheel 36 is coaxially disposed about output shaft OS for rotation about its axis $A_2$, but is not directly mechanically coupled to output shaft OS and hence rotates independently of output shaft OS while transmission T is in the disengaged position.

As also shown in FIGS. 3A and 3B, clutch C is coaxially disposed about output shaft OS. Clutch C is keyed, splined or otherwise coupled to output shaft OS in any suitable manner that enables clutch C to rotate with output shaft OS and transfer torque to output shaft OS, while being free to axially translate along the length of output shaft OS toward and away from worm gear 36. A first clutch engagement mechanism 39 is attached to or formed from clutch C and faces worm gear 36. A second clutch engagement mechanism 42 is attached to or formed from worm gear 36 and faces clutch C. First and second clutch engagement mechanisms 39 and 42 can have any structure suitable for efficiently transferring torque from worm gear 36 to clutch C as a result of bringing first and second clutch engagement mechanisms 39 and 42 into a meshing or coupling engagement. For example, first and second clutch engagement mechanisms 39 and 42 can be provided in the form of one or more dogs, pawls, teeth, or the like. A clutch arm, yoke, fork, or other suitable component 45 extends from clutch actuating shaft CS, and is in moving contact with clutch C at a recess or groove 48 formed in the body of clutch C. Clutch arm 45 reciprocates with clutch actuating shaft CS about an axis of rotation $A_3$ of clutch actuating shaft CS. Other components typically included with transmission T such as bearings, seals and the like, are generally known and thus need not be described.

It can be seen from FIGS. 3A and 3B that clutch arm 45 can be reciprocated through an arc between the disengaged and engaged positions of transmission T. The actuation of clutch arm 45 is described below in conjunction with several embodiments. The arcuate position of clutch arm 45 dictates the axial position of clutch C and thus whether transmission T is in its disengaged or engaged position. In the disengaged position illustrated in FIG. 3A, clutch arm 45 retains clutch C in an axial position at which a gap exists between first and second engagement mechanisms 39 and 42. Accordingly, worm gear 36 spins freely about output shaft OS, and the transmission path between input shaft IS and output shaft OS is decoupled. In the engaged position illustrated in FIG. 3B, clutch arm 45 shifts clutch C toward worm gear 36, bringing first clutch engagement mechanism 39 into mechanical communication with second clutch engagement mechanism 42, thereby completing the transmission path between input shaft IS and output shaft OS to enable power from motor M to be transferred to driving wheel(s) $W_D$.

It will be understood that many other coupling arrangements could be employed in substitution of worm 33 and worm gear 36, such as bevel gears, helical gears, hypoid gears, herringbone gears, and the like. Moreover, the mechanism represented by clutch C and its associated components is one of several mechanisms that could realize a selective coupling function for the embodiments disclosed herein. From the description below of embodiments of an apparatus for controlling transmission T, it will be appreciated that the embodiments are not limited in any manner to a particular clutch configuration, but rather can be applied to various configurations employing features such as a dog clutch, a cone clutch, a friction disk, a ratchet, a pressure plate, variable fluid pressure, and the like. For instance, the embodiments disclosed herein can generally be applied to any transmission capable of (1) switching between a disengaged and engaged state; and (2) while in the engaged state, capable of adjusting the final speed of output shaft OS over a stepped or continuous range of speeds in response to an input by the operator of lawnmower LM.

Referring now to FIGS. 4A-5B, an apparatus for controlling transmission T using a single linking member will now be described according to one embodiment. FIG. 4A corresponds to the disengaged state of clutch C (see FIG. 3A). FIG. 4B corresponds to the engaged state of clutch C (see FIG. 3B). As described below, FIG. 4B also generally corresponds to a LOW speed condition of transmission T at which the rotational speed or angular velocity of input shaft IS (and hence output shaft OS) is at a minimum (which can be zero). FIG. 4C corresponds to a HIGH speed condition of transmission T at which the speed of input shaft IS and, proportionately, output shaft OS, is at a maximum, again while clutch C is engaged to transfer power.

Referring first to FIG. 4A, the transmission control apparatus comprises an actuator that includes an actuator cam AC and any suitable device or variator for adjusting the torque transfer mechanism to vary torque and/or speed. In the present embodiment, this device is provided in the form of a pulley variator PV. Actuator cam AC and pulley variator PV are both mounted outside of a wall of transmission case 30. In the present embodiment as well as additional embodiments described below, the actuator actuates a suitable coupling mechanism such as clutch C in a first phase of rotation and actuates transmission pulley TP in a second phase of rotation. Actuator cam AC rotates about an axis of rotation $A_4$ through its mounting to a stub shaft 51 or other suitable component extending from the wall of transmission case 30.

In advantageous embodiments, and as described more fully below, actuator cam AC can be rotated through a first arc (corresponding to the first phase of rotation of actuator cam AC) from the disengaged state illustrated in FIG. 4A to the engaged/LOW speed state illustrated in FIG. 4B, and can be further rotated through a second, succeeding arc (corresponding to the second phase of rotation) from the engaged/LOW speed state illustrated in FIG. 4B to the engaged/HIGH speed state illustrated in FIG. 4C. Rotation of actuator cam AC is effected through its connection to transmission control cable TCC. Through an operator's control of transmission control cable TCC, actuator cam AC can be reciprocated back and forth through the second arc to adjust the speed of lawnmower LM during operation thereof. In addition, actuator cam AC can be reciprocated from the second arc and back through the first arc in order to disengage clutch C. If needed or desired, a return spring 54 can be interconnected between actuator cam AC and transmission case 30 or other suitable location to bias actuator cam AC toward the beginning of the first arc, thereby increasing the effort required of the operator to engage clutch C and to increase speed.

An actuator cam surface 57 is formed on a side of actuator cam AC, and generally rotates about axis of rotation $A_4$. Actuator cam surface 57 is profiled to implement the switching between the disengaged and engaged states during rotation through the first arc, and the increase or decrease of speed during rotation through the second arc. The profile of actuator cam surface 57 includes a first section 57A, a second section 57B, a third section 57C, and a fourth section 57D.

Continuing with FIG. 4A, the transmission control apparatus further comprises an actuating member for the coupling mechanism employed (e.g., clutch C), such as a clutch cam follower CF that is mounted to clutch actuating shaft CS for reciprocation therewith between the disengaged and engaged states. A return spring 60 can be provided if needed or desired to bias clutch cam follower CF toward the disengaged state. A convex lobe 63 of clutch cam follower CF contacts first section 57A of actuator cam surface 57 in the disengaged state, and contacts second section 57B of actuator cam surface 57 in the engaged state (FIG. 4B). It can be seen from FIGS. 4A and 4B that as the point of contact of lobe 63 moves from first section 57A to second section 57B, the change in the profile of actuator cam surface 57 causes clutch cam follower CF and hence clutch actuating shaft CS to rotate. As a result, clutch arm 45 reciprocates from the position shown in FIG. 3A to the position shown in FIG. 3B, thereby driving clutch C into engagement with worm gear 36. The profile of fourth section 57D of actuator cam surface 57 can be made such as to assist in rotating cam follower CF back to the disengaged position through contact with lobe 63. In conjunction with the present embodiment, given the location of clutch actuating shaft CS in FIGS. 4A-4C, it will be noted that in FIGS. 3A and 3B, clutch actuating shaft CS, clutch arm 45, and their axis of rotation $A_3$ would be located on the same side of output shaft OS as input shaft IS. The particular arrangement illustrated in FIGS. 3A and 3B more closely corresponds to the embodiments illustrated in FIGS. 6A-6C and FIGS. 8A-8C, described below.

Continuing with FIG. 4A, in the present embodiment, the actuator's pulley variator PV can be considered to be a separate component from its actuator cam AC, as pulley variator PV moves independently of actuator cam AC and rotates about a separate axis. In the present embodiment, pulley variator PV has a generally annular structure, and is coaxially disposed about input shaft IS and thus rotates about pulley or variator axis $A_1$, which is non-collinear relative to actuator cam axis $A_4$. Pulley variator PV includes an actuator arm 66 or other protrusion extending generally radially from an annular portion 67 of pulley variator PV relative to pulley axis $A_1$. Actuator arm 66 has a profiled pulley actuating surface 66A. It can be observed from FIG. 4B that third section 57C of actuator cam surface 57 is brought into contact with pulley actuating surface 66A as actuator cam AC rotates to the end of the first arc. Contact between actuator cam surface 57 and pulley actuating surface 66A enables the operator to control the transmission speed via movement of transmission control cable TCC and actuator cam AC. From FIGS. 4B and 4C, it can be observed that rotation of actuator cam AC through the second arc causes relative moving contact between actuator cam surface 57 and pulley actuating surface 66A, such that actuator cam AC urges pulley variator PV to rotate about pulley axis $A_1$. In the present example, transmission speed is increased by rotating pulley variator PV counterclockwise. To bias pulley variator PV against counterclockwise rotation and thus transmission T toward slower speeds, and also to prevent an immediate change in transmission speed upon engaging clutch C, a return spring 69 can be connected between actuator arm 66 and a suitable location such as a bracket 72 on transmission case 30.

Referring to the side view of FIG. 5A, pulley variator PV is axially interposed between transmission pulley TP and transmission case 30. A profiled pulley variator surface 75 extends from annular portion 67 of pulley variator PV generally axially relative to pulley axis $A_1$ and toward the wall of transmission case 30. Advantageous embodiments provide a plurality of pulley variator surfaces 75, arranged circumferentially about pulley axis $A_1$. The profile of each pulley variator surface 75 includes an incline or ramp 75A that is angled relative to pulley axis $A_1$. The transmission control apparatus further comprises any device suitable for interacting with the torque transfer mechanism adjustment device (e.g., pulley variator PV) to effect speed adjustment. In the specific examples disclosed herein, the speed adjustment device is a stationary pulley cam PC secured to any suitable structure such as the wall of transmission case 30. Pulley cam PC is coaxially disposed about input shaft IS, and is interposed between pulley variator PV and transmission case 30. Pulley cam PC has one or more pulley cam surfaces 78 corresponding to the one or more pulley variator surfaces 75. Pulley cam surfaces 78 are arranged circumferentially about pulley axis $A_1$. The profile of each pulley cam surface 78 is generally complementary to that of each pulley variator surface 75. Thus, each pulley cam surface 78 includes an incline or ramp 78A that is angled relative to pulley axis $A_1$ to enable each incline 75A of pulley variator surface 75 to slide in good contact with its corresponding incline 78A of pulley cam surface 78.

FIG. 5A generally corresponds to the state of transmission T at any point during rotation of actuator cam AC through the first arc, when clutch C is disengaged (see generally FIG. 4A). Alternatively, FIG. 5A can correspond to the LOW speed state of transmission T at the beginning of the second arc of rotation, where clutch C is engaged and actuator cam surface 57 has just made contact with pulley actuating surface 66A but has not yet rotated pulley variator PV (see generally FIG. 4B). In FIG. 5A, incline 75A of each pulley variator surface 75 contacts its corresponding incline 78A of pulley cam surface 78 generally at an upper region thereof. At this position, the axial distance of pulley variator PV from transmission case 30 is at a maximum, transmission pulley TP is fully "closed", the pitch between first and second pulley members $TP_1$ and $TP_2$ is at a minimum, the radius of rotation of endless member EM as it is carried by first and second pulley members $TP_1$ and $TP_2$ is at a maximum, and the resulting speed of transmission T is at a minimum.

FIG. 5B generally corresponds to the HIGH speed state of transmission T, and accordingly likewise generally corresponds to the position of the actuator components illustrated in FIG. 4C. The counterclockwise rotation of pulley variator PV by actuator cam AC has caused incline 75A of each pulley variator surface 75 to slide down the corresponding incline 78A of each pulley cam surface 78, thereby enabling pulley variator PV to move axially toward transmission case 30. At this position, the axial distance of pulley variator PV from transmission case 30 is at a minimum, transmission pulley TP is fully "open", the pitch between first and second pulley members $TP_1$ and $TP_2$ at a maximum, the radius of rotation of endless member EM as it is carried by first and second pulley members $TP_1$ and $TP_2$ is at a minimum, and the resulting speed of transmission T is at a maximum. It will be understood that the operator, through selective actuation of transmission control cable TCC, can increase and decrease the speed of transmission T to intermediate states between the extreme LOW and HIGH states respectively illustrated in FIGS. 5A and 5B. When slowing down transmission T, the clockwise rotation of pulley variator PV causes incline 75A of pulley variator surface 75 to follow the profile of incline 78A of pulley cam surface 78, thereby forcing first pulley member $TP_1$ to axially move toward second pulley member TP$_2$ and close transmission pulley TP, and force endless member EM to move radially outwardly relative to input shaft IS.

Figure 6A:
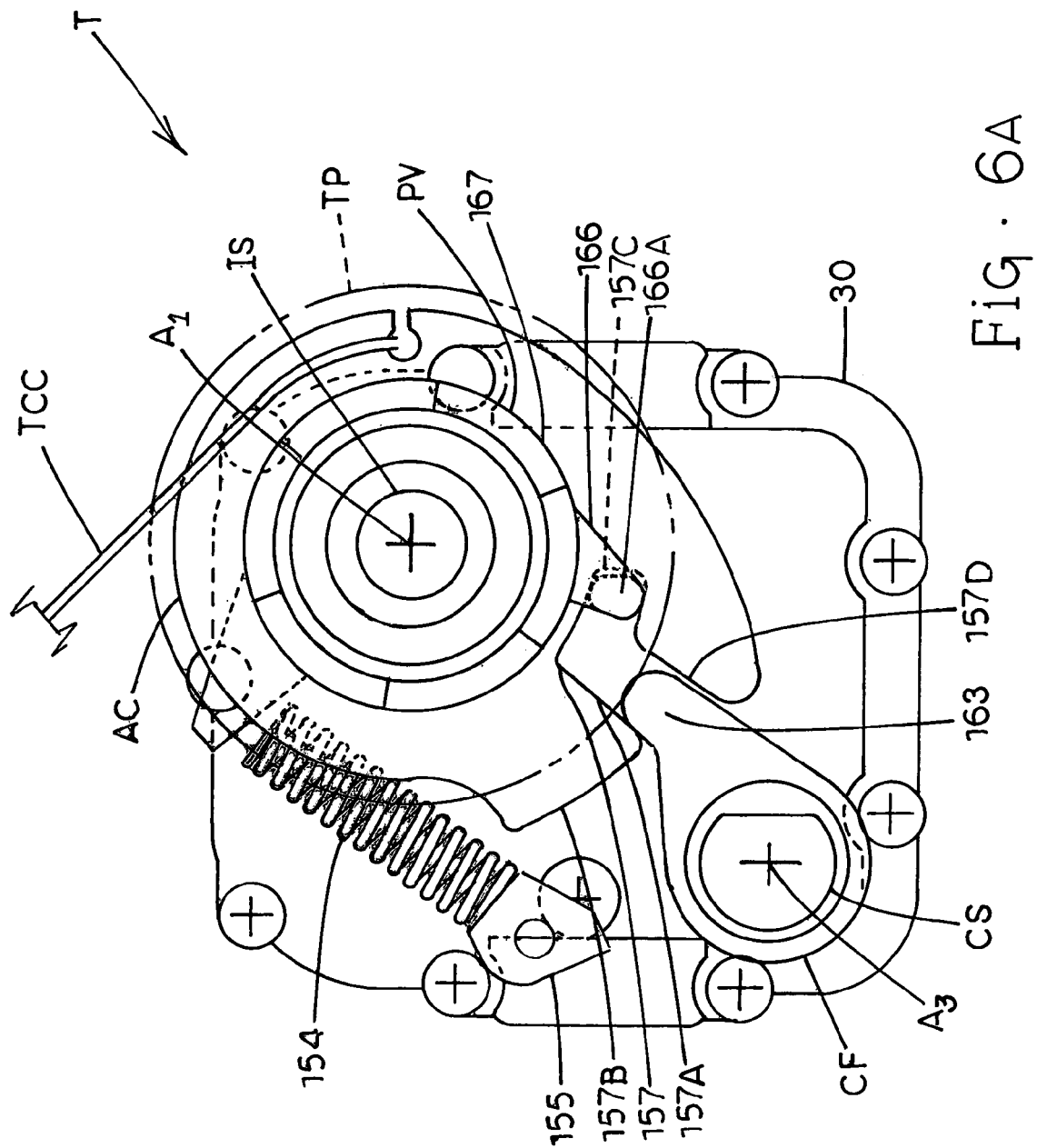
FIG. 6A is a plan view of a transmission control apparatus provided in accordance with another embodiment disclosed herein, while the transmission is in a disengaged state.
Figure 6B:
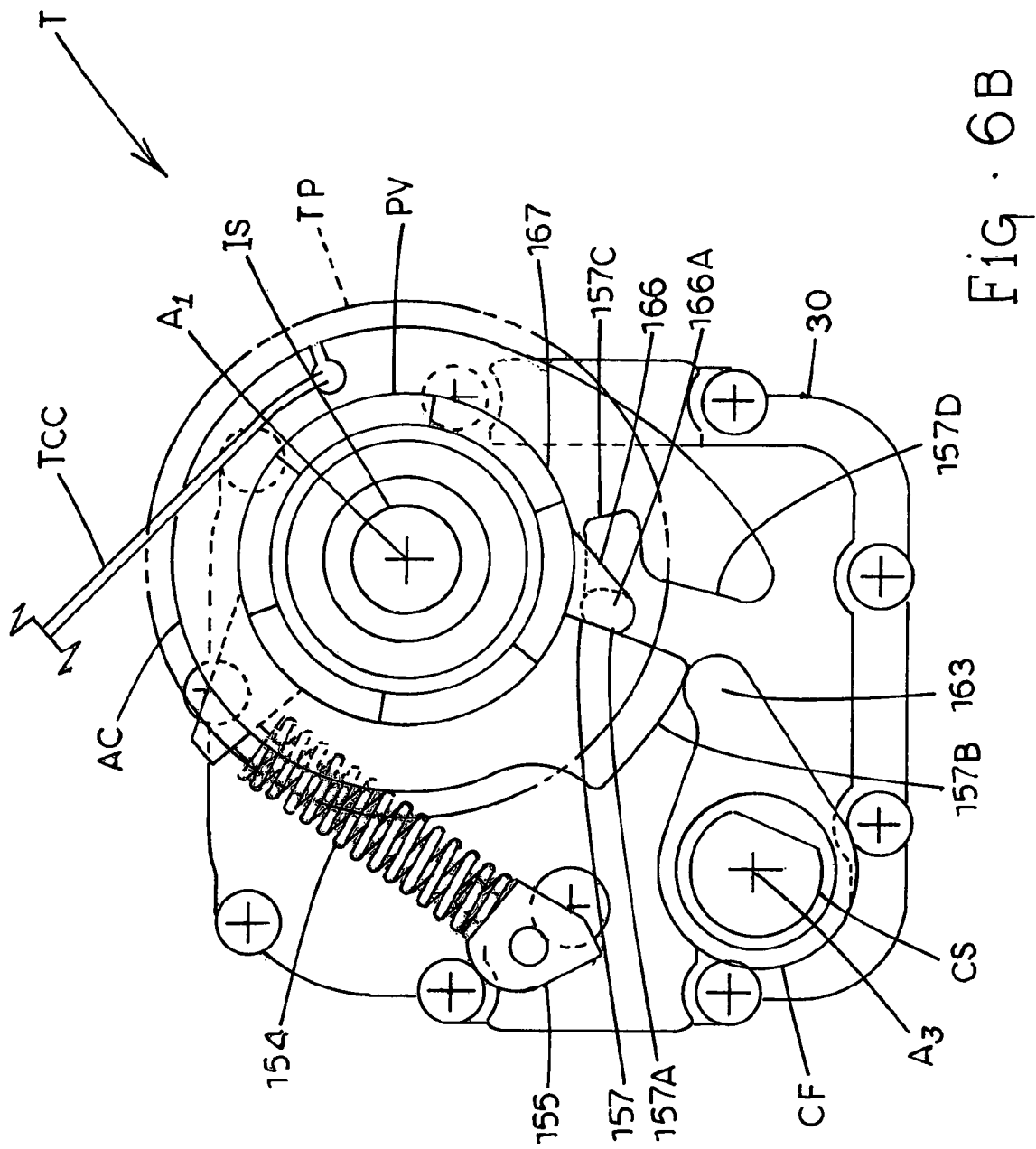
FIG. 6B is a plan view of the transmission control apparatus illustrated in FIG. 6A, while the transmission is in an engaged state and at a LOW speed state.
Figure 6C:
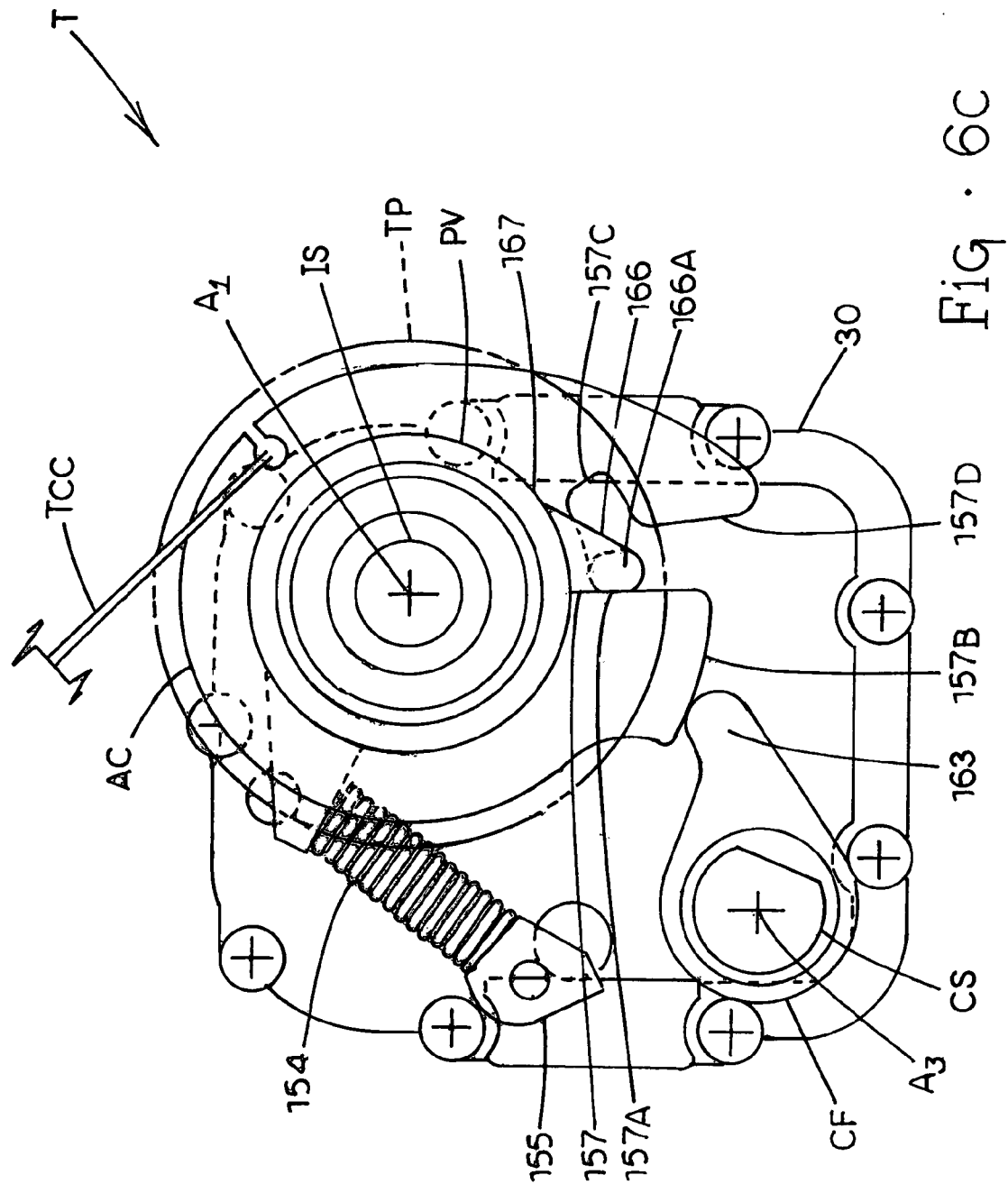
FIG. 6C is a plan view of the transmission control apparatus illustrated in FIG. 6A, while the transmission is in a HIGH speed state.

Referring now to FIGS. 6A-7B, an apparatus and method for controlling transmission T using a single linking member will now be described according to another embodiment. FIG. 6A corresponds to the OFF state of transmission T and thus the disengaged state of clutch C (see FIG. 3A). FIG. 6B corresponds to the ON state of transmission T and thus the engaged state of clutch C (see FIG. 3B). FIG. 6B also generally corresponds to the LOW speed condition of transmission T. FIG. 6C corresponds to the HIGH speed condition of transmission T.

Referring first to FIG. 6A, the actuator's actuator cam AC and pulley variator PV both rotate about pulley axis A$_1$. Actuator cam AC includes an actuator cam surface 157 that is profiled differently in comparison to the embodiment illustrated in FIGS. 4A-4C. In the present embodiment illustrated in FIGS. 6A-6C, actuator cam surface 157 includes a first section 157A, a second section 157B, a third section 157C, and a fourth section 157D. A return spring 154 can be interconnected between actuator cam AC and a bracket 155 on transmission case 30 to bias actuator cam AC toward the beginning of the first arc, thereby increasing the effort required of the operator to engage clutch C and increase speed. A portion of actuator cam surface 157 that includes first section 157A, third section 157C, and fourth section 157D is concave and generally L-shaped. A lobe 163 of clutch cam follower CF extends into this portion between first section 157A and fourth section 157D. Lobe 163 contacts first section 157A of actuator cam surface 157 in the disengaged state, and contacts second section 157B of actuator cam surface 157 in the engaged state (FIG. 4B). It can be seen from FIGS. 6A and 6B that as the point of contact of lobe 163 moves from first section 157A to second section 157B, the change in the profile of actuator cam surface 157 causes clutch cam follower CF and hence clutch actuating shaft CS to rotate. As a result, clutch arm 45 reciprocates from the position shown in FIG. 3A to the position shown in FIG. 3B, thereby driving clutch C into engagement with worm gear 36. The profile of fourth section 157D of actuator cam surface 157 can be made such as to assist in rotating cam follower CF back to the disengaged position through contact with lobe 163. A return spring for biasing cam follower CF back to the disengaged state is not needed in this embodiment.

Continuing with FIG. 6A, pulley variator PV includes an actuator arm 166 or other protrusion extending generally radially from an annular portion 167 of pulley variator PV relative to pulley axis A$_1$. Actuator arm 166 has a pulley actuating portion or surface 166A extending generally axially in parallel with pulley axis A$_1$. Pulley actuating portion 166A extends into the concave portion of actuator cam surface 157 that includes first section 157A, third section 157C, and fourth section 157D, between first section 157A and third section 157C. It can be observed from FIG. 6B that third section 157C of actuator cam surface 157 is brought into contact with pulley actuating portion 166A as actuator cam AC rotates to the end of the first arc. Contact between actuator cam surface 157 and pulley actuating portion 166A enables the operator to control the transmission speed via movement of transmission control cable TCC and actuator cam AC. From FIGS. 6B and 6C, it can be observed that rotation of actuator cam AC through the second arc causes first section 157A of actuator cam surface 157 to contact pulley actuating portion 166A, such that actuator cam AC urges pulley variator PV to rotate about pulley axis A$_1$. To bias pulley variator PV against counterclockwise rotation and thus transmission T toward slower speeds, a torsion spring 169 can be connected between a wall of transmission case 30 and pulley variator PV, as shown in the side views of FIGS. 7A and 7B. The present embodiment can be configured such that, during a rapid rotation of actuator cam AC back through the second arc to quickly slow transmission speed, third section 157C contacts pulley actuating portion 166A to assist in clockwise rotation of pulley variator PV.

Referring to FIG. 7A, pulley variator PV in the present embodiment includes a profiled pulley variator surface 175, and preferably of circumferentially spaced pulley variator surfaces 175. The profile of each pulley variator surface 175 can essentially be the same as that shown in the previous embodiment illustrated in FIGS. 5A and 5B. Hence, each pulley variator surface 175 in the present embodiment includes an incline or ramp 175A that is angled relative to pulley axis A$_1$. The transmission control apparatus in the present embodiment likewise comprises a stationary pulley cam PC secured to any suitable structure such as a wall of transmission case 30. Pulley cam PC is interposed between pulley variator PV and transmission case 30. As in the previous embodiment, pulley cam PC has one or more pulley cam surfaces 178 corresponding to the one or more pulley variator surfaces 175. Pulley cam surfaces 178 are also arranged circumferentially about pulley axis A$_1$. The profile of each pulley cam surface 178 is generally complementary to that of each pulley variator surface 175. Thus, each pulley cam surface 178 includes an incline or ramp 178A that is angled relative to pulley axis A$_1$ to enable each incline 175A of pulley variator surface 175 to slide in good contact with its corresponding incline 178A of pulley cam surface 178.

The operation of pulley variator PV in the present embodiment is generally analogous to that of the previous embodiment. FIG. 7A generally corresponds to the state of transmission T at any point during rotation of actuator cam AC through the first arc, when clutch C is disengaged (see generally FIG. 6A). Alternatively, FIG. 7A can correspond to the LOW speed state of transmission T at the beginning of the second arc of rotation, where clutch C is engaged and actuator cam surface 157 has just made contact with pulley actuating portion 166A but has not yet rotated pulley variator PV (see generally FIG. 6B). In FIG. 7A, incline 175A of each pulley variator surface 175 contacts its corresponding incline 178A of pulley cam surface 178 generally at an upper region thereof. At this position, transmission pulley TP is fully "closed" as described above. FIG. 7B generally corresponds to the HIGH speed state of transmission T, and accordingly likewise generally corresponds to the position of the actuator components illustrated in FIG. 6C. Counterclockwise rotation of pulley variator PV by actuator cam AC causes incline 175A of each pulley variator surface 175 to slide down corresponding incline 178A of each pulley cam surface 178, whereby pulley variator PV enables transmission pulley TP to eventually reach the fully "open" state. As in the previous embodiment, when slowing down transmission T, the clockwise rotation of pulley variator PV causes incline 175A of pulley variator surface 175 to follow the profile of incline 178A of pulley cam surface 178, thereby forcing first pulley member TP$_1$ to axially move toward second pulley member TP$_2$ and close transmission pulley TP.

Figure 8A:
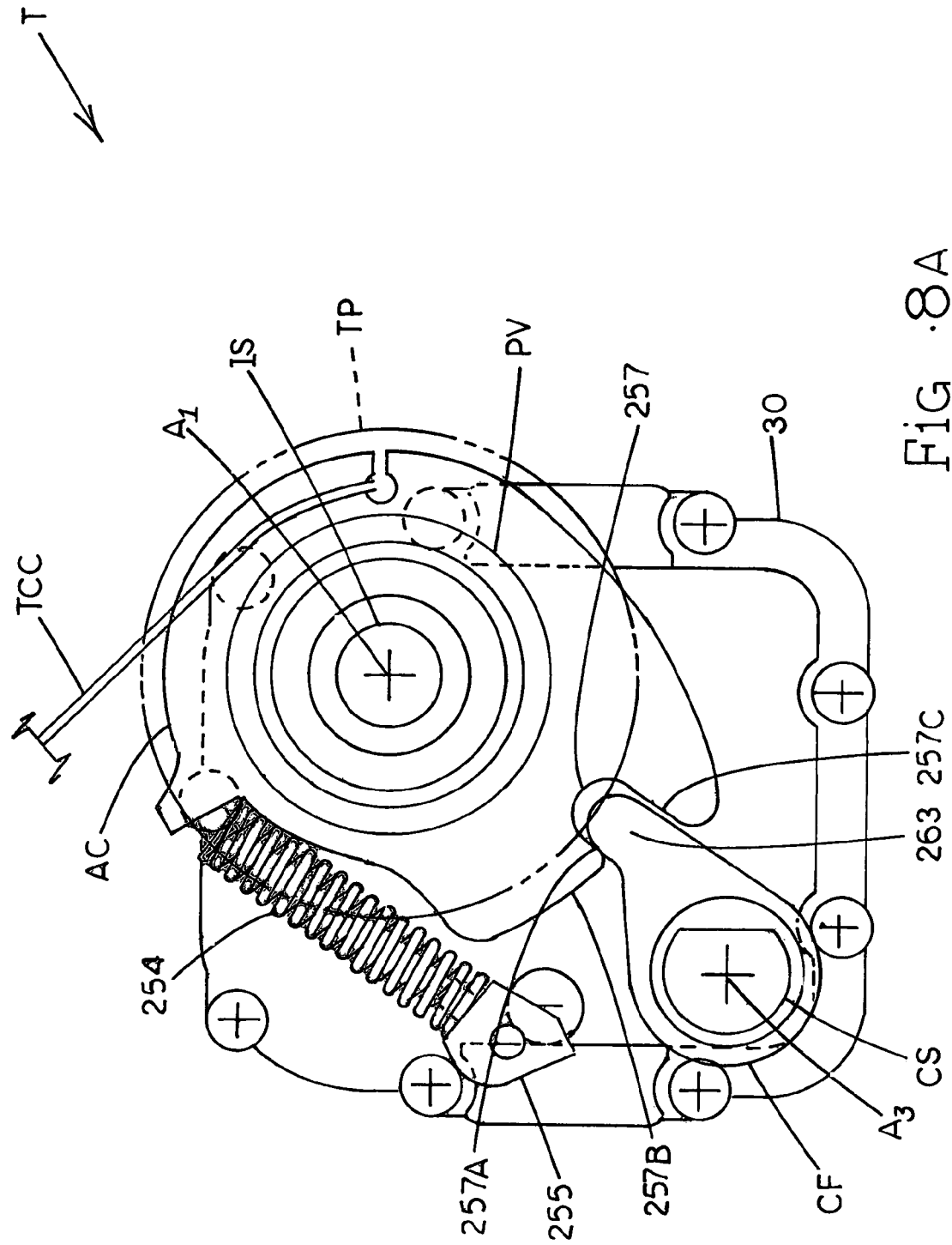
FIG. 8A is a plan view of a transmission control apparatus provided in accordance with another embodiment disclosed herein, while the transmission is in a disengaged state.

Referring now to FIGS. 8A-9C, an apparatus and method for controlling transmission T using a single linking member will now be described according to yet another embodiment. FIG. 8A corresponds to the OFF state of transmission T and thus the disengaged state of clutch C (see FIG. 3A). FIG. 8B corresponds to the ON state of transmission T and thus the engaged state of clutch C (see FIG. 3B). FIG. 8B also generally corresponds to the LOW speed condition of transmission T. FIG. 8C corresponds to the HIGH speed condition of transmission T.

Referring first to FIG. 8A, unlike the previously described embodiments, the actuator is a single component that rotates about pulley axis $A_1$, and hence includes both actuator cam AC and pulley variator PV. Actuator cam AC includes an actuator cam surface 257 that is profiled differently in comparison to the previously described embodiments. In the present embodiment illustrated in FIGS. 8A-8C, actuator cam surface 257 includes a first section 257A, a second section 257B, and a third section 257C. A return spring 254 can be interconnected between actuator cam AC and a bracket 255 on transmission case 30 to bias actuator cam AC toward the beginning of the first arc, thereby increasing the effort required of the operator to engage clutch C and increase speed. Because actuator cam AC and pulley variator PV angularly reciprocate together as a unitary actuator structure, return spring 254 can alternatively be connected to the portion of the actuator comprising pulley variator PV.

A lobe 263 of clutch cam follower CF extends into a concave portion of actuator cam surface 257 that includes first section 257A and third section 257C. Lobe 263 contacts first section 257A of actuator cam surface 257 in the disengaged state, and contacts second section 257B of actuator cam surface 257 in the engaged state (FIG. 4B). It can be seen from FIGS. 8A and 8B that as the point of contact of lobe 263 moves from first section 257A to second section 257B, the change in the profile of actuator cam surface 257 causes clutch cam follower CF and hence clutch actuating shaft CS to rotate. As a result, clutch arm 45 reciprocates from the position shown in FIG. 3A to the position shown in FIG. 3B, thereby driving clutch C into engagement with worm gear 36. The profile of third section 257C of actuator cam surface 257 can be made such as to assist in rotating cam follower CF back to the disengaged position through contact with lobe 263.

In the present embodiment, a return spring for biasing cam follower CF back to the disengaged state is not needed. Moreover, because actuator cam AC and pulley variator PV are part of a unitary actuator structure, pulley variator PV does not require any form of protrusion for engagement with actuator cam AC during rotation through the second arc in the speed-varying phase of operation. The rotation of actuator cam AC in either the clockwise or counterclockwise sense in response to an operator's manipulation of transmission control cable TCC corresponds directly to rotation of pulley variator PV.

Referring to FIG. 9A, pulley variator PV in the present embodiment includes a profiled pulley variator surface 275, and preferably a plurality of pulley variator surfaces 275. The profile of each pulley variator surface 275, however, differs from those of the previous embodiments in that the profile is stepped so as to have more than one inclined portion, with each inclined portion being offset from another inclined portion by a flat portion. In the example specifically illustrated in FIG. 9A, each pulley variator surface 275 includes, in order of contiguousness, a first flat 275A, a first incline 275B, a second flat 275C, a second incline 275D, and a third flat 275E. Each flat 275A, 275C, and 275E is generally normal to pulley axis $A_1$, and each incline 275B and 275D is angled relative to pulley axis $A_1$. The transmission control apparatus in the present embodiment likewise comprises a stationary pulley cam PC secured to any suitable structure such as a wall of transmission case 30. Pulley cam PC is interposed between pulley variator PV and transmission case 30. As in the previous embodiments, pulley cam PC has one or more pulley cam surfaces 278 corresponding to the one or more pulley variator surfaces 275. Pulley cam surfaces 278 are also arranged circumferentially about pulley axis $A_1$. In the present embodiment, however, the profile of each pulley cam surface 278 is stepped and inclined in a generally complementary manner relative to that of each pulley variator surface 275. Thus, each pulley cam surface 278 includes, in order of contiguousness, a first flat 278A, a first incline 278B, a second flat 278C, a second incline 278D, and a third flat 278E.

FIG. 9A generally corresponds to the state of transmission T prior to rotation of actuator cam AC through the first arc, when clutch C is disengaged (see generally FIG. 8A). At this state, for each corresponding pair of pulley variator surfaces 275 and pulley cam surfaces 278, first flat 275A of pulley variator surface 275 contacts second flat 278C of pulley cam surface 278, and first incline 275B of pulley variator surface 275 contacts second incline 278D of pulley cam surface 278. At this position, the axial distance of pulley variator PV from transmission case 30 is at a maximum, transmission pulley TP is fully "closed", the pitch between first and second pulley members $TP_1$ and $TP_2$ at a minimum, the radius of rotation of endless member EM as it is carried by first and second pulley members $TP_1$ and $TP_2$ is at a maximum, and the resulting speed of transmission T is at a minimum.

FIG. 9B generally corresponds to the LOW speed state of transmission T at the beginning of the second arc of rotation, where clutch C has just been engaged (see generally FIG. 8B). Alternately, FIG. 9B corresponds to a beginning portion of the second arc of rotation, i.e., at a time shortly after clutch C has been engaged. In either case, it can be observed that the provision of second flat 278C of pulley cam surface 278 (and its moving contact with first 275A flat of pulley variator surface 275), introduces a time delay in the axial actuation of pulley variator PV. As actuator cam AC and pulley variator PV rotate through the first arc to the position shown in FIG. 9B, first flat 275A of pulley variator surface 275 moves along second flat 278C of pulley cam surface 278. Thus, pulley cam PC neither permits nor causes axial translation of pulley variator PV during this first phase. In turn, first pulley member $TP_1$ is not actuated during this first phase and transmission pulley TP remains closed, resulting in no change in transmission speed. This configuration eliminates the need for a spring or other means for preventing an abrupt change in transmission speed upon engagement of clutch C.

Figure 8C:
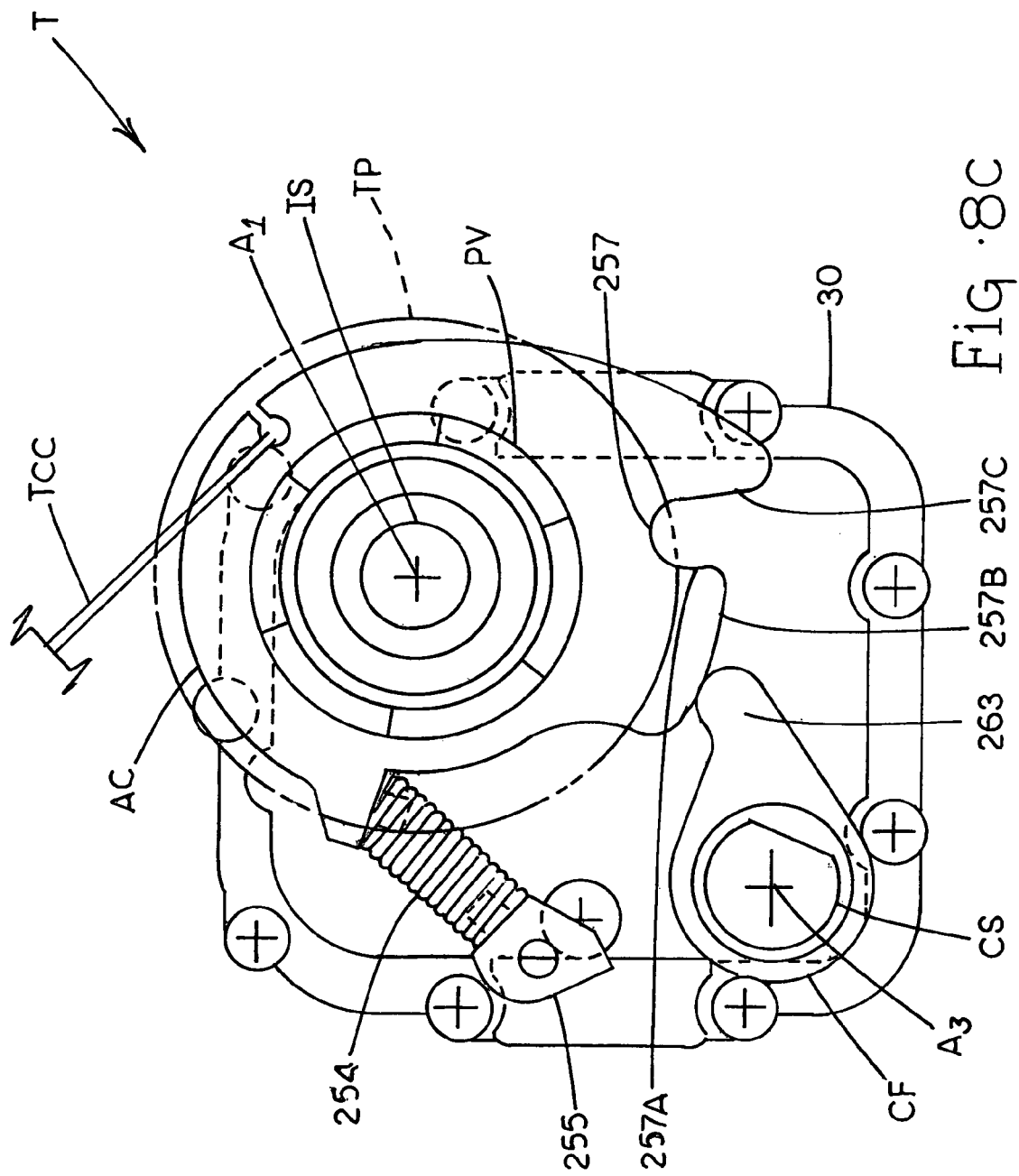
FIG. 8C is a plan view of the transmission control apparatus illustrated in FIG. 8A, while the transmission is in a HIGH speed state.
Figure 9C:
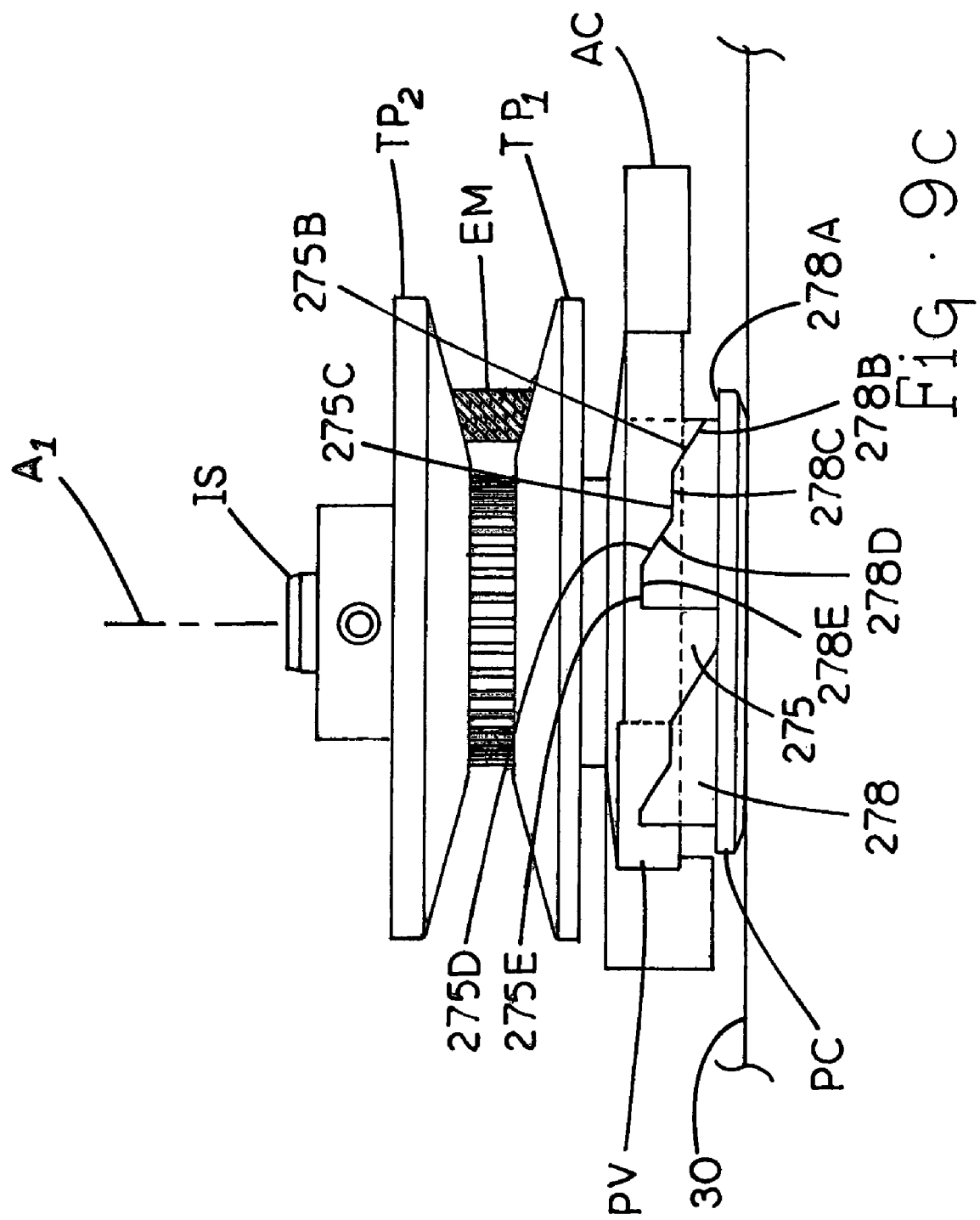
FIG. 9C is a side elevation view illustrating portions of the transmission pulley and pulley variator of the transmission control apparatus illustrated in FIGS. 8A-8C while the transmission is in a HIGH speed state.

FIG. 9C generally corresponds to the HIGH speed state of transmission T, and accordingly likewise generally corresponds to the position of the actuator components illustrated in FIG. 8C. To attain this state, for each corresponding pair of pulley variator surfaces 275 and pulley cam surfaces 278, the counterclockwise rotation of actuator cam AC and pulley variator PV has caused first flat 275A of pulley variator surface 275 to rotate out of contact with second flat 278C of pulley cam surface 278. At this point, first incline 275B of pulley variator surface 275 can slide down first incline 278B of pulley cam surface 278, and second incline 275D of pulley variator surface 275 can slide down second incline 278D of pulley cam surface 278. Because the sliding contact between pulley variator surface 275 and pulley cam surface 278 at their respective incline pairs has an axial component, this motion enables pulley variator PV to move axially toward transmission case 30, until first, second and third flats 275A, 275C and 275E of pulley variator surface 275 respectively abut against first, second and third flats 278A, 278C and 278E of pulley cam surface 278 as illustrated in FIG. 9C. At this position, the axial distance of pulley variator PV from transmission case 30 is at a minimum, transmission pulley TP is fully "open", the pitch between first and second pulley members $TP_1$ and $TP_2$ at a maximum, the radius of rotation of endless member EM as it is carried by first and second pulley members $TP_1$ and $TP_2$ is at a minimum, and the resulting speed of transmission T is at a maximum. Through selective actuation of transmission control cable TCC while pulley variator PV is in the second arc of rotation with incline pairs contacting each other, the operator can increase and decrease the speed of transmission T to intermediate states between the extreme LOW and HIGH states respectively illustrated in FIGS. 9A and 9B. When slowing down transmission T, the clockwise rotation of pulley variator PV causes first incline 275B of pulley variator surface 275 to follow the profile of first incline 278B of pulley cam surface 278, thereby forcing first pulley member $TP_1$ to axially move toward second pulley member $TP_2$ and close transmission pulley TP.

From the foregoing, it can therefore be seen that embodiments disclosed herein provide apparatuses and methods for controlling a transmission, and particularly a variable-speed transmission, in which a single linking member such as a cable can be employed to control both coupling/decoupling and the speed of the transmission. As noted previously, the embodiments can be utilized in conjunction with any mobile or stationary machine that includes a suitable transmission.

It will be understood that various details of the subject matter disclosed herein may be changed without departing from the scope of the subject matter. Furthermore, the foregoing description is for the purpose of illustration only, and not for the purpose of limitation.

What is claimed is:

1. An apparatus for controlling a variable-speed transmission, the transmission comprising a coupler for alternately engaging and disengaging power between the transmission and a motor, and an adjustable torque transfer mechanism interconnecting the transmission and the motor for varying a speed of the transmission, the apparatus comprising:
    (a) an actuator cam rotatable through a first phase and a subsequent second phase and comprising a variator surface rotatable therewith;
    (b) a cam follower in communication with the coupler and the actuator cam, wherein rotation of the actuator cam through the first phase causes movement of the cam follower, which causes movement of the coupler between a disengaged position and an engaged position; and
    (c) a speed adjustment cam comprising a speed adjustment cam surface, the speed adjustment cam surface comprising a flat and an incline, wherein the variator surface is movable along the flat in response to rotation of the actuator cam through the first phase without enabling adjustment of the torque transfer mechanism, and the variator surface is movable along the incline in response to rotation of the actuator cam through the second phase for enabling adjustment of the torque transfer mechanism.

2. The apparatus according to claim 1 wherein the actuator cam comprises first and second actuator cam surfaces, and the cam follower is movable from contact with the first actuator cam surface at the disengaged position and into contact with the second actuator cam surface at the engaged position in response to rotation of the actuator cam through the first phase.

3. The apparatus according to claim 1 wherein the actuator cam is rotatable about an axis and the speed adjustment cam is coaxially disposed about the axis.

4. The apparatus according to claim 3 wherein the speed adjustment cam is stationary.

5. The apparatus according to claim 1 wherein the variator surface is substantially complementarily profiled relative to the speed adjustment cam surface.

6. The apparatus according to claim 1 wherein the variator surface is profiled for enabling axial adjustment of a variable-pitch pulley communicating with the transmission in response to movement of the variator surface along the incline of the speed adjustment cam surface.

7. The apparatus according to claim 6 wherein the speed adjustment cam comprises a pulley cam on which the variator surface travels.

8. The apparatus according to claim 1 wherein the cam follower is in mechanical communication with the coupler and the actuator cam.

9. An apparatus for controlling a variable-speed transmission, comprising:
    (a) an actuator cam rotatable through a first phase and a subsequent second phase in response to operator control;
    (b) a cam follower movable by the actuator cam during rotation through the first phase between a disengaged state at which the transmission is decoupled from a torque input and an engaged state at which the transmission is coupled to the torque input; and
    (c) a speed adjustment device comprising a movable portion rotatable together with the actuator cam and movable by the actuator cam between a relatively lower speed state and a relatively higher speed state during rotation of the actuator cam through the second phase and not during rotation of the actuator cam through the first phase;
    wherein the movable portion is rotatable about an axis, the speed adjustment device comprises an inclined speed adjustment cam surface, the movable portion comprises an inclined movable portion surface movable along the inclined speed adjustment cam surface during rotation of the actuator cam through the second phase, the inclined movable portion surface is angled relative to the axis, and the inclined speed adjustment cam surface is generally complementarily angled relative to the inclined movable portion surface; and
    wherein the speed adjustment device comprises a flat speed adjustment cam surface adjoining an end of the inclined speed adjustment cam surface and oriented generally normally to the axis, and the movable portion comprises a flat movable portion surface oriented generally parallel to the flat speed adjustment cam surface and movable along the flat speed adjustment cam surface during rotation of the actuator cam through the first phase.

10. The apparatus according to claim 9 wherein the actuator cam and the movable portion are rotatable together as a unitary structure.

11. An apparatus for controlling a variable-speed transmission, the transmission comprising a coupler for alternately engaging and disengaging power between the transmission and a motor, and an adjustable torque transfer mechanism interconnecting the transmission and the motor for varying a speed of the transmission, the apparatus comprising:
    (a) an actuator rotatable through a first phase and a subsequent second phase, and comprising an actuator cam surface and a variator, the actuator cam surface and the variator being rotatable together;
    (b) a cam follower in communication with the coupler and the actuator cam surface, wherein rotation of the actuator through the first phase causes movement of the cam follower, which causes movement of the coupler between a disengaged position and an engaged position; and
    (c) a speed adjustment cam, wherein the variator is movable along the speed adjustment cam for enabling adjustment of the torque transfer mechanism during rotation of the actuator through the second phase and not during rotation of the actuator through the first phase;

wherein the variator is rotatable about an axis, the speed adjustment cam comprises an inclined speed adjustment cam surface, the variator comprises an inclined variator surface movable along the inclined speed adjustment cam surface during rotation of the actuator through the second phase, the inclined variator surface is angled relative to the axis, and the inclined speed adjustment cam surface is generally complementarily angled relative to the inclined variator surface; and wherein the speed adjustment cam comprises a flat speed adjustment cam surface adjoining an end of the inclined speed adjustment cam surface and oriented generally normally to the axis, and the variator comprises a flat variator surface oriented generally parallel to the flat speed adjustment cam surface and movable along the flat speed adjustment cam surface during rotation of the actuator through the first phase.

12. The apparatus according to claim 11 wherein the variator is movable along the speed adjustment cam in response to contact between the variator and the actuator cam surface.

13. The apparatus according to claim 11 wherein the actuator has a unitary structure comprising the actuator cam surface and the variator.

14. The apparatus according to claim 11 wherein the actuator cam surface and the variator are rotatable about the same axis.

15. The apparatus according to claim 11 wherein the actuator cam surface comprises first and second actuator cam surface sections, and the cam follower is movable from contact with the first actuator cam surface section and into contact with the second actuator cam surface section in response to rotation of the actuator through the first phase.

16. The apparatus according to claim 11 wherein:
(a) the flat variator surface is movable along the flat speed adjustment cam surface in response to rotation of the actuator through the first phase for rotating the variator without changing an axial position of the variator; and
(b) the inclined variator surface is movable along the inclined speed adjustment cam surface in response to rotation of the actuator through the second phase for rotating the variator while changing the axial position of the variator.

17. The apparatus according to claim 11 comprising a biasing member engaging the variator during rotation of the actuator through the second phase for biasing rotation of the variator generally in a direction from the second phase toward the first phase.

18. The apparatus according to claim 17 wherein the variator has an axis of rotation and the biasing member is generally oriented in an offset relation to the axis of rotation.

19. The apparatus according to claim 11 wherein the variator and the speed adjustment cam are profiled for enabling axial displacement of the variator during movement of the variator along the speed adjustment cam, the torque transfer mechanism comprises a pulley for carrying an endless member drivable by the motor, the pulley comprises first and second pulley members rotatable about an input shaft of the transmission, and the first pulley member is axially translatable along the input shaft toward and away from the second pulley member in response to axial displacement of the variator for changing a radius of rotation of the endless member and a speed of the input shaft.

20. The apparatus according to claim 19 wherein the variator and the first and second pulley members are rotatable about the same axis.

21. The apparatus according to claim 11 wherein the cam follower is in mechanical communication with the coupler and the actuator cam surface.

22. An apparatus for controlling a variable-speed transmission, the transmission comprising a coupler for alternately engaging and disengaging power between the transmission and a motor, and an adjustable torque transfer mechanism interconnecting the transmission and the motor for varying a speed of the transmission, the apparatus comprising:
(a) an actuator rotatable through a first phase and a subsequent second phase, and comprising an actuator cam surface and a variator, the actuator cam surface and the variator being rotatable together;
(b) a cam follower in communication with the coupler and the actuator cam surface, wherein rotation of the actuator through the first phase causes movement of the cam follower, which causes movement of the coupler between a disengaged position and an engaged position; and
(c) a speed adjustment cam, wherein the variator is movable along the speed adjustment cam for enabling adjustment of the torque transfer mechanism during rotation of the actuator through the second phase and not during rotation of the actuator through the first phase, wherein:
(i) the speed adjustment cam comprises a speed adjustment cam surface;
(ii) the variator comprises a variator surface movable along the speed adjustment cam surface and rotatable about an axis;
(iii) the variator surface comprises an inclined variator surface section angled relative to the axis, and a flat variator surface section generally normal to the axis;
(iv) the speed adjustment cam surface comprises an inclined speed adjustment cam surface section generally complementarily angled relative to the inclined variator surface section, and a flat speed adjustment cam surface section generally parallel to the flat variator surface section;
(v) the flat variator surface section is movable along the flat speed adjustment cam surface section in response to rotation of the actuator through the first phase for rotating the variator without changing an axial position of the variator; and
(f) the inclined variator surface section is movable along the inclined speed adjustment cam surface section in response to rotation of the actuator through the second phase for rotating the variator while changing the axial position of the variator.

23. The apparatus according to claim 22 wherein the cam follower is in mechanical communication with the coupler and the actuator cam surface.

* * * * *